US012476367B2

(12) United States Patent
Deng

(10) Patent No.: US 12,476,367 B2
(45) Date of Patent: Nov. 18, 2025

(54) ANTENNA SYSTEM AND ELECTRONIC DEVICE

(71) Applicant: Huawei Technologies Co., Ltd., Shenzhen (CN)

(72) Inventor: Shaogang Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 18/696,132

(22) PCT Filed: Aug. 26, 2022

(86) PCT No.: PCT/CN2022/115221

§ 371 (c)(1),
(2) Date: Mar. 27, 2024

(87) PCT Pub. No.: WO2023/051123

PCT Pub. Date: Apr. 6, 2023

(65) Prior Publication Data

US 2025/0096466 A1 Mar. 20, 2025

(30) Foreign Application Priority Data

Sep. 29, 2021 (CN) .......................... 202111156219.7

(51) Int. Cl.
*H01Q 5/371* (2015.01)
*H01Q 9/24* (2006.01)
(Continued)

(52) U.S. Cl.
CPC ............... *H01Q 5/371* (2015.01); *H01Q 9/24* (2013.01); *H01Q 9/30* (2013.01); *H01Q 13/10* (2013.01); *H01Q 21/28* (2013.01)

(58) Field of Classification Search
CPC ............ H01Q 1/243; H01Q 9/42; H01Q 1/38; H01Q 5/371; H01Q 1/48; H01Q 5/378; H01Q 13/10; H01Q 1/36
See application file for complete search history.

(56) References Cited

U.S. PATENT DOCUMENTS 7,978,140 B2 * 7/2011 Wong ........................ H01Q 9/36 343/702
8,982,005 B2 * 3/2015 Tu .......................... H01Q 13/10 343/767
(Continued)

FOREIGN PATENT DOCUMENTS

CN 202513284 U 10/2012
CN 103811861 B 6/2016
(Continued)

*Primary Examiner* — Wei (Victor) Y Chan
(74) *Attorney, Agent, or Firm* — Slater Matsil, LLP

(57) ABSTRACT

An antenna system includes a first antenna, a second antenna, and a tuning stub, where the first antenna and the second antenna have a same first operating frequency band or similar first operating frequency bands. The tuning stub is electrically connected to the first antenna, and the tuning stub is configured to adjust an equivalent current path of the first antenna, so that a connection line between a projection point of a maximum equivalent current point of the first antenna and a projection point of a maximum equivalent current point of the second antenna on a first plane tends to be more perpendicular to a projection of the equivalent current path of the first antenna or of the second antenna on the first plane; or the equivalent current path of the first antenna and of the second antenna tend to be more perpendicular to each other.

20 Claims, 36 Drawing Sheets

(a) (b) (c)

(51) Int. Cl.

| | |
|---|---|
| ***H01Q 9/30*** | (2006.01) |
| ***H01Q 13/10*** | (2006.01) |
| ***H01Q 21/28*** | (2006.01) |

(56) References Cited

U.S. PATENT DOCUMENTS

| | | | | |
|---|---|---|---|---|
| 9,472,855 | B2 * | 10/2016 | Toyao | H01Q 1/243 |
| 2004/0257283 | A1 | 12/2004 | Asano et al. | |
| 2018/0269586 | A1 * | 9/2018 | Kawahata | H01Q 21/28 |
| 2021/0367334 | A1 * | 11/2021 | Lv | H01Q 1/36 |
| 2021/0367349 | A1 * | 11/2021 | Lv | H01Q 15/22 |
| 2022/0077594 | A1 * | 3/2022 | Gamalski | H01Q 21/065 |
| 2022/0123473 | A1 * | 4/2022 | Aviv | H01Q 9/065 |

FOREIGN PATENT DOCUMENTS

| | | | |
|---|---|---|---|
| CN | 211789533 | U | 10/2020 |
| EP | 2610964 | B1 | 7/2013 |
| JP | 2008017047 | A | 1/2008 |
| JP | 5885011 | B1 | 3/2016 |

* cited by examiner (a)

(b)

(a) (b)

ANTENNA SYSTEM AND ELECTRONIC DEVICE

CROSS-REFERENCE TO RELATED APPLICATIONS

This application is a National Stage of International Patent Application No. PCT/CN2022/115221, filed on Aug. 26, 2022, which claims priority to Chinese Patent Application No. 202111156219.7, filed on Sep. 29, 2021, both of which are hereby incorporated by reference in their entireties.

TECHNICAL FIELD

This application relates to the field of communication technologies, and in particular, to an antenna system and an electronic device.

BACKGROUND

Currently, many communication devices have communication modules that have a same frequency but different systems, such as a wireless fidelity (wireless fidelity, Wi-Fi) module and a Bluetooth (Bluetooth, BT)/Bluetooth low energy (Bluetooth low energy, BLE) module each having an operating frequency band of 2.4 GHz in a mobile phone. Such communication modules need to work at the same time, but because operating frequencies of the communication modules are the same, a phenomenon of mutual interference between systems exists.

To reduce interference between communication systems and ensure performance of the communication systems, specific isolation is required between antennas of the communication systems. Higher isolation indicates better performance of the communication system. However, in an existing high-isolation antenna design solution, during actual application, due to impact of various metals, printed circuit boards (printed circuit boards, PCB), radio frequency cables, power cables, and other components, isolation between antennas cannot reach a high level. Therefore, how to design an antenna system with high isolation becomes a technical problem to be urgently resolved.

SUMMARY

In view of this, this application provides an antenna system and an electronic device, to improve isolation between antennas.

To achieve the foregoing objective, according to a first aspect, an embodiment of this application provides an antenna system, including a first antenna, a second antenna, and a tuning stub, where the first antenna and the second antenna have a same first operating frequency band or similar first operating frequency bands.

The tuning stub is electrically connected to the first antenna, and the tuning stub is configured to adjust an equivalent current path of the first antenna.

A connection line between a projection point of a maximum equivalent current point of the first antenna and a projection point of a maximum equivalent current point of the second antenna on a first plane and a projection of the equivalent current path of the first antenna on the first plane form a first included angle before the first antenna loads the tuning stub, and form a second included angle after the first antenna loads the tuning stub.

The connection line between the projection point of the maximum equivalent current point of the first antenna and the projection point of the maximum equivalent current point of the second antenna on the first plane and a projection of an equivalent current path of the second antenna on the first plane form a third included angle before the first antenna loads the tuning stub, and form a fourth included angle after the first antenna loads the tuning stub.

A projection of the equivalent current path of the first antenna and a projection of the equivalent current path of the second antenna on a second plane form a fifth included angle before the first antenna loads the tuning stub, and form a sixth included angle after the first antenna loads the tuning stub.

The first included angle to the sixth included angle are all less than or equal to 90 degrees.

The second included angle is greater than the first included angle, or the fourth included angle is greater than the third included angle, or the sixth included angle is greater than the fifth included angle.

According to the antenna system provided in embodiments of this application, the tuning stub may adjust the equivalent current path of the first antenna, so that the connection line between the projection point of the maximum equivalent current point of the first antenna and the projection point of the maximum equivalent current point of the second antenna on the first plane tends to be more perpendicular to the projection of the equivalent current path of the first antenna or the second antenna on the first plane. In this way, incoming wave components that are of another antenna and that are received by radiation arms on two sides of a feed point of one of the first antenna and the second antenna can well cancel each other, to reduce interference between the two antennas, and improve isolation between the two antennas. Alternatively, the tuning stub may adjust the equivalent current path of the first antenna, so that the equivalent current path of the first antenna and the equivalent current path of the second antenna tend to be more perpendicular to each other. In this way, polarization directions of the two antennas tend to be more perpendicular to each other, and incoming wave components received by the two antennas from each other are reduced, to reduce interference between the two antennas and improve isolation between the two antennas.

In a possible implementation of the first aspect, the first plane is perpendicular to the equivalent current path of the second antenna. In this way, tuning effect can be improved.

In a possible implementation of the first aspect, the fifth included angle is 90 degrees. In this way, polarization directions of the two antennas are perpendicular to each other, so that an antenna solution with higher isolation can be obtained based on an antenna solution with high isolation.

In a possible implementation of the first aspect, the first antenna, the second antenna, and the tuning stub are all in a straight line shape. The first antenna includes a first radiation arm and a second radiation arm that are interconnected, a feed point of the first antenna is located between the first radiation arm and the second radiation arm, an electrical length of each of the first radiation arm and the second radiation arm is a quarter of a first wavelength, and the first wavelength is a wavelength corresponding to a center operating frequency of the first operating frequency band.

The tuning stub is connected to a position that is on the first radiation arm or the second radiation arm and that is close to the feed point, and an included angle is formed between the tuning stub and the second antenna.

In the foregoing antenna structure, the tuning stub is connected to the position that is on the first radiation arm or the second radiation arm and that is close to the feed point, so that impact of the tuning stub on an operating frequency band of the first antenna can be reduced, and tuning effect can be improved. An included angle is formed between the tuning stub and the second antenna, so that the projection of the equivalent current path of the first antenna on the first plane can be adjusted. In this way, the second angle is greater than the first included angle.

In a possible implementation of the first aspect, the tuning stub is perpendicular to the first antenna, and the tuning stub is connected to the feed point.

In the foregoing implementation, the tuning stub is perpendicular to the first antenna, so that the equivalent current path of the first antenna can be better changed, and tuning effect of the tuning stub can be improved. The tuning stub is connected to the feed point, so that impact of the tuning stub on an operating frequency band of the first antenna can be better reduced, and tuning effect can be improved.

In a possible implementation of the first aspect, a current of the first antenna flows from the second radiation arm to the first radiation arm.

The tuning stub is connected to a side that is of the first radiation arm and that faces the second antenna, or the tuning stub is connected to a side that is of the second radiation arm and that is away from the second antenna.

In the foregoing implementation, the connection line between the projection point of the maximum equivalent current point of the first antenna and the projection point of the maximum equivalent current point of the second antenna on the first plane tends to be more perpendicular to the projection of the equivalent current path of the first antenna or the second antenna on the first plane.

In a possible implementation of the first aspect, the first antenna and the second antenna have a same second operating frequency band or similar second operating frequency bands.

The first antenna includes a first radiation arm, a second radiation arm, a third radiation arm, a fourth radiation arm, and an impedance tuning arm. A feed point of the first antenna is located between two ends of the impedance tuning arm.

An operating frequency band of each of the first radiation arm and the second radiation arm is the first operating frequency band, and the first radiation arm and the second radiation arm are connected to the two ends of the impedance tuning arm.

An operating frequency band of each of the third radiation arm and the fourth radiation arm is the second operating frequency band, and the third radiation arm and the fourth radiation arm are connected to the two ends of the impedance tuning arm.

Each radiation arm of the first antenna is located on one side of the feed point, and the tuning stub is located on the other side of the feed point.

In the foregoing implementation, each radiation arm of the first antenna is located on one side of the feed point, and the tuning stub is located on the other side of the feed point. In this way, impact of the tuning stub on an operating frequency band of the first antenna can be reduced, and tuning effect can be improved.

In a possible implementation of the first aspect, the tuning stub includes a first stub and a second stub that are perpendicular to each other, one end of the second stub is connected to a middle part of the first stub, and the other end of the second stub is connected to the feed point.

A first tuning element and a second tuning element are disposed on the second stub at an interval, and the first tuning element is located between the second tuning element and the feed point. A sum of an electrical length of a stub between the first tuning element and the second tuning element and an electrical length of the first tuning element is greater than a quarter of a second wavelength, the second wavelength is less than a first wavelength, the first wavelength is a wavelength corresponding to a center operating frequency of the first operating frequency band, and the second wavelength is a wavelength corresponding to a center operating frequency of the second operating frequency band.

Based on the foregoing implementation, better tuning effect can be achieved.

In a possible implementation of the first aspect, the first radiation arm and the second radiation arm each form a semi-annular bending structure, the third radiation arm is located in an area enclosed by the first radiation arm, and the fourth radiation arm is located in an area enclosed by the second radiation arm. In this way, space can be saved.

In a possible implementation of the first aspect, the sixth included angle is 90 degrees. In this way, the polarization direction of the first antenna and the polarization direction of the second antenna can continue to be perpendicular to each other, so that isolation between the two antennas can be better improved.

In a possible implementation of the first aspect, the first antenna and the second antenna are linear slot antennas that are perpendicular to each other on different planes. The first antenna includes a first circuit board and a first slot, and the tuning stub is located on the first circuit board.

In a possible implementation of the first aspect, the tuning stub is a slot, the tuning stub is located at an end that is of the first slot and that is close to the second antenna, and the tuning slot is perpendicular to the first slot. In this way, the equivalent current path of the first antenna can be better changed, and tuning effect of the tuning stub can be improved.

In a possible implementation of the first aspect, a slot in the antenna system includes a closed slot and/or an open slot. An electrical length of the closed slot is a half of a first wavelength, an electrical length of the open slot is a quarter of the first wavelength, and the first wavelength is a wavelength corresponding to a center operating frequency of the first operating frequency band.

In a possible implementation of the first aspect, the tuning stub is a radiation arm, and the tuning stub is vertically disposed on the first circuit board.

In a possible implementation of the first aspect, the tuning stub is disposed at an end that is of the first slot and that is away from the second antenna, a slot of the second antenna is located on one side of the first slot, and the tuning stub is located at an edge position on the other side of the first slot. In this way, better tuning effect can be achieved.

In a possible implementation of the first aspect, the first plane is parallel to the equivalent current path of the first antenna and the equivalent current path of the second antenna.

In a possible implementation of the first aspect, the first antenna, the second antenna, and the tuning stub are all in a straight line shape. The first antenna includes a first radiation arm and a second radiation arm that are sequentially connected, a feed point of the first antenna is located between the first radiation arm and the second radiation arm, an electrical length of each of the first radiation arm and the second radiation arm is a quarter of a first wavelength, and the first wavelength is a wavelength corresponding to a center operating frequency of the first operating frequency band.

The tuning stub is connected to a position that is on the first radiation arm or the second radiation arm and that is close to the feed point, and the tuning stub is parallel to the first plane.

In the foregoing implementation, the tuning stub is connected to the position that is on the first radiation arm or the second radiation arm and that is close to the feed point, so that impact of the tuning stub on an operating frequency band of the first antenna can be reduced, and tuning effect can be improved. The tuning stub is parallel to the first plane, so that space occupied by the antenna system in a direction perpendicular to the first plane can be reduced. In addition, the projection of the equivalent current path of the first antenna on the first plane can be better adjusted, and tuning effect can be improved.

In a possible implementation of the first aspect, the tuning stub is perpendicular to the first antenna, and the tuning stub is connected to the feed point.

In the foregoing implementation, the tuning stub is perpendicular to the first antenna, so that the equivalent current path of the first antenna can be better changed, and tuning effect of the tuning stub can be improved. The tuning stub is connected to the feed point, so that impact of the tuning stub on an operating frequency band of the first antenna can be better reduced, and tuning effect can be improved.

In a possible implementation of the first aspect, the antenna system further includes a circuit board, the first antenna and the second antenna are both in a straight line shape, and the first antenna and the second antenna are disposed on a first side edge of the circuit board at an interval, and are electrically connected to the circuit board.

A feed point of the first antenna is located at a connection position between a radiation arm of the first antenna and the circuit board, and a feed point of the second antenna is located at a connection position between a radiation arm of the second antenna and the circuit board.

The tuning stub is disposed on the first side edge of the circuit board and is electrically connected to the circuit board, and a current on the tuning stub and a current on the first antenna are opposite in direction.

In a possible implementation of the first aspect, an electrical length of the tuning stub is greater than a quarter of the first wavelength, and/or the electrical length of the tuning stub is less than 0.35 times of the first wavelength. The first wavelength is the wavelength corresponding to the center operating frequency of the first operating frequency band. In this way, impact of the tuning stub on an operating frequency band of the first antenna can be better reduced, and tuning effect can be improved.

In a possible implementation of the first aspect, a tuning element is disposed on the tuning stub. In this way, an operating frequency and a polarization direction of the radiation arm can be tuned by using the tuning element, to reduce an antenna length.

According to a second aspect, an embodiment of this application provides an electronic device, including the antenna system according to any one of the first aspect or the implementations of the first aspect.

It may be understood that, for beneficial effects of the second aspect, refer to related descriptions in the first aspect. Details are not described herein again.

DETAILED DESCRIPTION OF ILLUSTRATIVE EMBODIMENTS

Figure 1A:
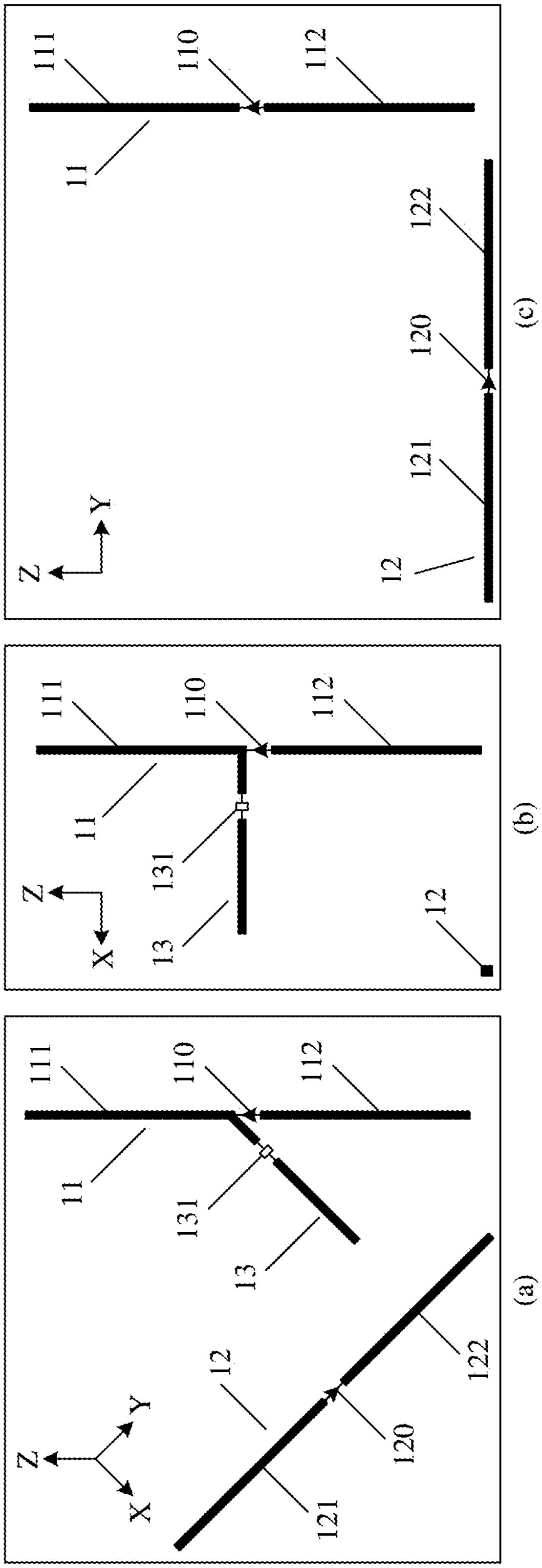
FIG. 1A is a schematic diagram of a structure of an antenna system according to an embodiment of this application.

The following describes embodiments of this application with reference to the accompanying drawings in embodiments of this application. Terms used in implementations of embodiments of this application are merely used to explain specific embodiments of this application, and are not intended to limit this application.

Isolation between two antennas is related to current modes of the two antennas. When equivalent current paths of the two antennas are perpendicular to each other, polarization directions of the two antennas are perpendicular to each other, and the two antennas receive fewer incoming wave components (namely, interference waves) from each other. Correspondingly, isolation between the two antennas is improved. When a connection line between maximum current points (namely, maximum equivalent current points) of the equivalent current paths of the two antennas is perpendicular to the equivalent current path of one (referred to as a target antenna herein) of the two antennas, incoming wave components that are of the other antenna and that are received by radiation arms on two sides of a feed point of the target antenna are equal in amplitude and opposite in phase, and the two incoming wave components can cancel each other when reaching the feed point of the target antenna. In this way, the isolation between the two antennas can be effectively improved.

Based on this, for a current technical problem that isolation between antennas is not high enough, embodiments of this application provide an antenna system. An equivalent current path of at least one of two antennas is adjusted mainly by loading a tuning stub in an antenna system, or an equivalent current path of an antenna is rotated by rotating a radiation arm of the antenna, so that a connection line between projection points of maximum current points of the equivalent current paths of the two antennas on a target plane trends to be more perpendicular to a projection of an adjusted equivalent current path of the antenna on the target plane, or the equivalent current paths of the two antennas tend to be more perpendicular to each other, to improve isolation between antennas in the antenna system.

The antenna system provided in embodiments of this application may be applied to an electronic device that has a communication function, for example, a mobile phone, a tablet computer, a notebook computer, a gateway device, a router, a virtual reality (virtual reality, VR) device, or an augmented reality (augmented reality, AR) device. The antenna system may include a plurality of antennas, and each antenna may include one or more operating frequency bands. For ease of understanding of embodiments of this application, the following example is used to describe an antenna isolation solution in this application: The antenna system includes two antennas (a first antenna and a second antenna). One of the first antenna and the second antenna is configured to transmit a Wi-Fi signal, and the other antenna is configured to transmit a Bluetooth signal. Each antenna includes one or two operating frequency bands. When the antenna includes one operating frequency band, the operating frequency band is a 2.4 GHz frequency band, and an operating frequency of the antenna is in a range of 2.4 GHz to 2.5 GHZ. When the antenna includes two operating frequency bands, one operating frequency band is the 2.4 GHz frequency band, and the other operating frequency band is a 5 GHz frequency band, and an operating frequency of the antenna is in a range of 5.1 GHz to 5.9 GHZ.

Specific embodiments are used below to describe in detail the technical solutions of this application. The following several specific embodiments may be combined with each other, and a same or similar concept or process may not be described repeatedly in some embodiments.

First, several feasible solutions for improving antenna isolation by using a tuning stub are introduced.

Embodiment 1

FIG. 1A is a schematic diagram of a structure of an antenna system according to an embodiment of this application, where (a) in FIG. 1A is a schematic diagram of the antenna system at a specific angle, (b) in FIG. 1A is a schematic diagram of the antenna system on an XOZ plane, and (c) in FIG. 1A is a schematic diagram of the antenna system on a YOZ plane.

The antenna system includes a first antenna 11, a second antenna 12, and a tuning stub 13. The first antenna 11 and the second antenna 12 are a pair of dipole antennas whose operating frequency band is a 2.4 GHz frequency band. The first antenna 11, the second antenna 12, and the tuning stub 13 are all in a straight line shape, and the first antenna 11 and the second antenna 12 are perpendicular to each other on different planes.

The first antenna 11 may include a first radiation arm 111 and a second radiation arm 112 that are connected to each other. A feed point 110 of the first antenna 11 is located between the first radiation arm 111 and the second radiation arm 112. An electrical length of each of the first radiation arm 111 and the second radiation arm 112 may be 0.25λ, and λ is a wavelength corresponding to a center operating frequency (2.45 GHZ) of the 2.4 GHz frequency band. A current of the first antenna 11 flows from the second radiation arm 112 to the first radiation arm 111.

The second antenna 12 may include a third radiation arm 121 and a fourth radiation arm 122 that are connected to each other, a feed point 120 of the second antenna 12 is located between the third radiation arm 121 and the fourth radiation arm 122, and an electrical length of each of the third radiation arm 121 and the fourth radiation arm 122 is 0.25λ. A current of the second antenna 12 flows from the third radiation arm 121 to the fourth radiation arm 122.

An electrical length of the tuning stub 13 may be approximately 0.25), and may be specifically greater than 0.25λ and less than 0.35λ. The tuning stub 13 may be connected to a position that is on the first radiation arm 111 or the second radiation arm 112 and that is close to the feed point, to reduce impact of the tuning stub 13 on an operating frequency band of the first antenna 11 and improve tuning effect. In addition, an included angle may be formed between the tuning stub 13 and the second antenna 12, to further improve tuning effect.

To further improve tuning effect, the tuning stub 13 may be connected to an end that is on the first radiation arm 111 or the second radiation arm 112 and that is close to the feed point 110, that is, may be connected to the feed point 110, and is perpendicular to the first antenna 11.

In an optional implementation, as shown in FIG. 1A, the tuning stub 13 is connected to a side that is of the first radiation arm 111 and that faces the second antenna 12. In this case, a current direction of the tuning stub 13 is similar to a current direction of the first radiation arm 111, and a current flows from the feed point 110 to a tail end of the tuning stub 13. In another optional implementation, as shown in (a) to (c) in FIG. 1B, the tuning stub 13 is connected to a side that is of the second radiation arm 112 and that is away from the second antenna 12. In this case, a current direction of the tuning stub 13 is similar to a current direction of the second radiation arm 112, and a current flows from the tuning stub 13 to the feed point. In the foregoing connection manner, an equivalent current path of the first antenna 11 can be better adjusted, to improve tuning effect.

During specific implementation, the tuning stub 13 may be parallel to a target plane (referred to as a first plane herein), to achieve better tuning effect. The first plane is perpendicular to an equivalent current path of the second antenna 12. The first plane in FIG. 1A and FIG. 1B is a plane parallel to the XOZ plane.

In this embodiment, a tuning element may be loaded on each radiation arm of the antenna system, and an operating frequency and a polarization direction of the radiation arm are tuned by using the tuning element, to reduce an antenna length. The tuning element may be a component like a resistor, a capacitor, or an inductor. For example, no tuning element is loaded on a radiation arm of the first antenna 11 and the second antenna 12, and physical lengths of the first radiation arm 111, the second radiation arm 112, the third radiation arm 121, and the fourth radiation arm 122 are all 27 mm. A tuning element 131 is loaded on the tuning stub 13. In FIG. 1A, the physical length of the tuning stub 13 is 31 mm, and the tuning element 131 is a resistor of 0 ohm (Ω). In FIG. 1B, the physical length of the tuning stub 13 is 28 mm, and a tuning element 132 is a resistor of 0Ω.

Figure 1B:
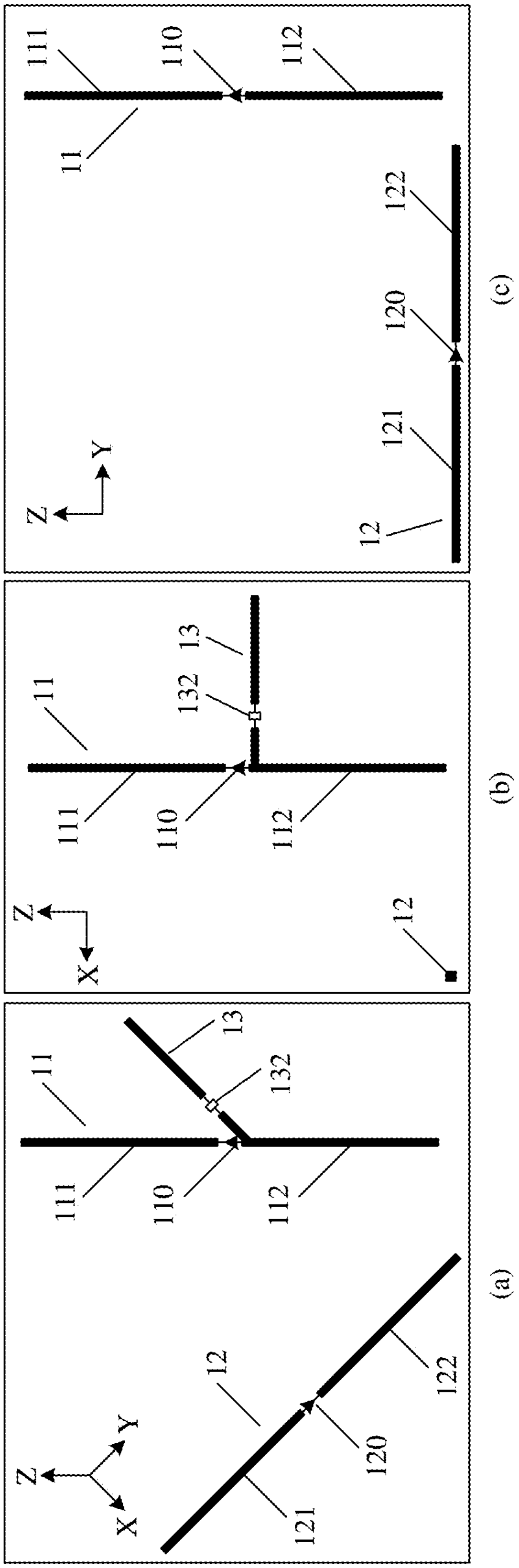
FIG. 1B is a schematic diagram of a structure of another antenna system according to an embodiment of this application.
Figure 2:
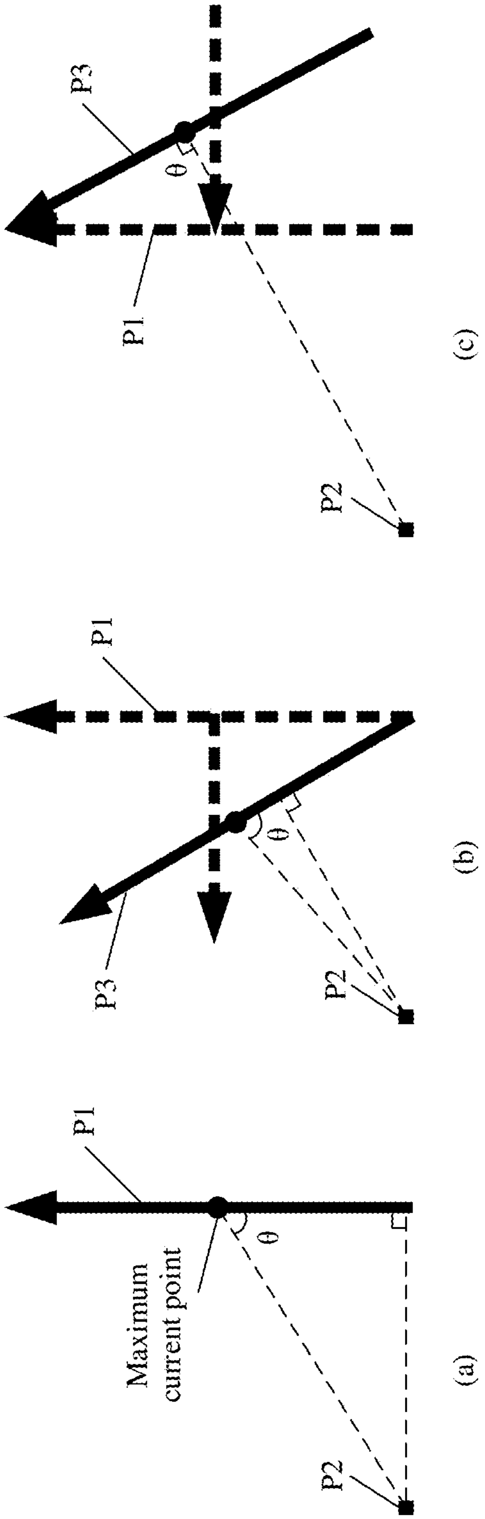
FIG. 2 is a schematic diagram of current paths before and after a tuning stub is loaded in the antenna system in FIG. 1A and FIG. 1B.

FIG. 2 is a schematic diagram of current paths before and after the tuning stub is loaded in the antenna system in FIG. 1A and FIG. 1B, where (a) in FIG. 2 shows projections of current paths of the first antenna 11 and the second antenna 12 on a first plane before the tuning stub 13 is loaded in the antenna system, (b) in FIG. 2 shows projections of current paths of the first antenna 11 and the second antenna 12 on a first plane after the tuning stub 13 is loaded in the antenna system in FIG. 1A, and (c) in FIG. 2 shows projections of current paths of the first antenna 11 and the second antenna 12 on a first plane after the tuning stub 13 is loaded in the antenna system in FIG. 1B.

As shown in FIG. 1A and FIG. 1B, before the tuning stub 13 is loaded, a radiation arm of the first antenna 11 is perpendicular to a radiation arm of the second antenna 12. Correspondingly, as shown in (a) in FIG. 2, a current path P1 of the first antenna 11 is perpendicular to a current path P2 of the second antenna 12, that is, polarization directions of the two antennas are perpendicular to each other. In this way, isolation between the two antennas can be improved. However, a perpendicular foot from a maximum current point of the current path P2 of the second antenna 12 to the current path P1 of the first antenna 11 is far away from a maximum current point of the current path P1 of the first antenna 11, and an included angle θ between a connection line between the maximum current points of the current paths of the two antennas, and the current path P1 of the first antenna 11 is far less than 90 degrees. Therefore, isolation between the two antennas is not optimal.

As shown in (b) in FIG. 2, after the tuning stub 13 is loaded on the first radiation arm 111, a part of a resonance current is transferred from the first radiation arm 111 of the first antenna 11 to the tuning stub 13. Therefore, an actual equivalent current path P3 of the first antenna 11 is rotated. After the tuning stub 13 is loaded, a perpendicular foot from a maximum current point of the current path P2 of the second antenna 12 to the equivalent current path P3 of the first antenna 11 tends to be closer to a maximum current point of the equivalent current path P3 of the first antenna 11, and correspondingly, an included angle θ between a connection line between the maximum current points of the equivalent current paths of the two antennas, and the equivalent current path P3 of the first antenna 11 is closer to 90 degrees. Therefore, isolation between the two antennas can be improved.

As shown in (c) in FIG. 2, after the tuning stub 13 is loaded, a part of a resonance current is transferred from the second radiation arm 112 of the first antenna 11 to the tuning stub 13. Therefore, an actual equivalent current path P3 of the first antenna 11 is rotated. After the tuning stub 13 is loaded on the second radiation arm 112, a perpendicular foot from the maximum current point of the current path P2 of the second antenna 12 to the equivalent current path P3 of the first antenna 11 is moved to a maximum current point of the equivalent current path P3 of the first antenna 11, and correspondingly, an included angle θ between a connection line between the maximum current points of the equivalent current paths of the two antennas, and the equivalent current path P3 of the first antenna 11 is 90 degrees. Therefore, isolation between the two antennas is further improved.

Figure 3A:
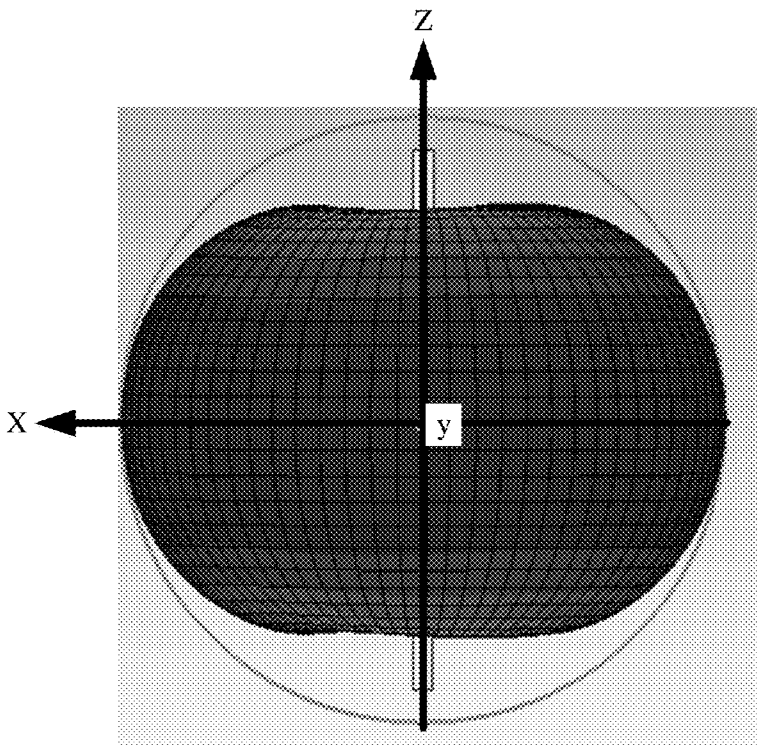
FIG. 3A is a 3D pattern of a first antenna before a tuning stub is loaded in the antenna system in FIG. 1A and FIG. 1B.
Figure 3B:
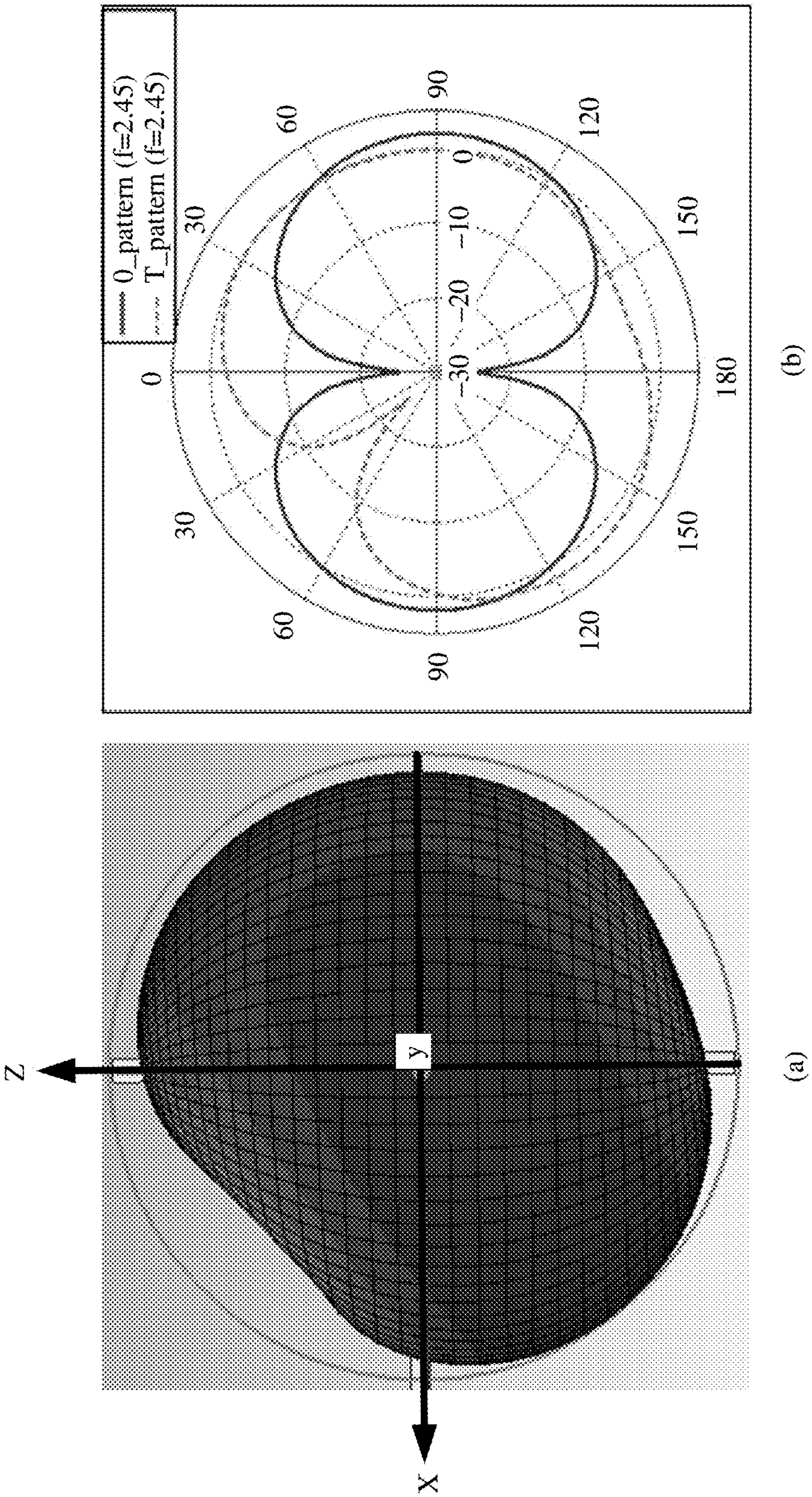
FIG. 3B is a pattern of a first antenna after a tuning stub is loaded in the antenna system in FIG. 1A.
Figure 3C:
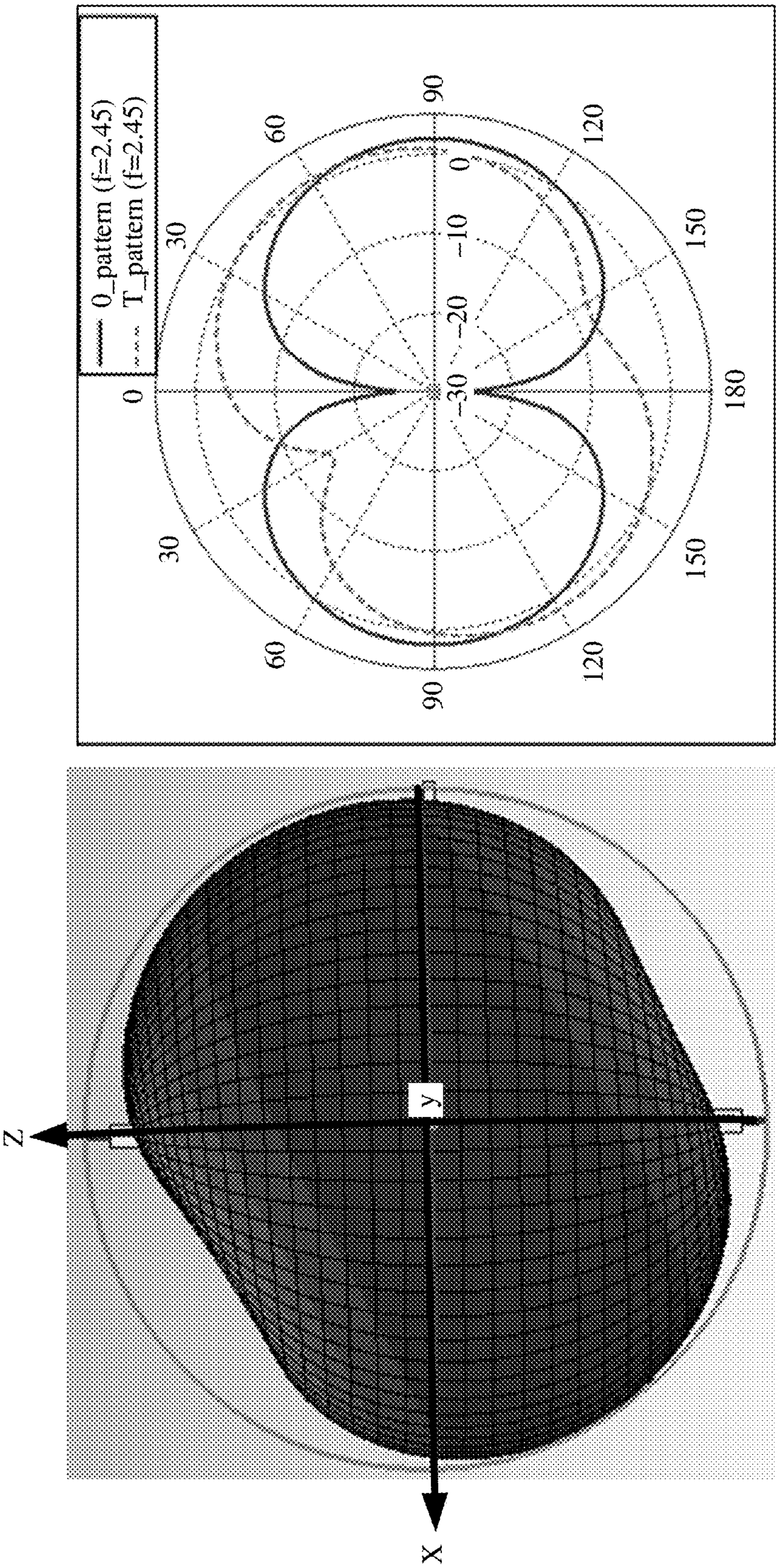
FIG. 3C is a pattern of a first antenna after a tuning stub is loaded in the antenna system in FIG. 1B.

FIG. 3A is a 3D pattern of the first antenna before the tuning stub is loaded in the antenna system in FIG. 1A and FIG. 1B. FIG. 3B is a 2D pattern of the first antenna after the tuning stub is loaded in the antenna system in FIG. 1A, where (a) in FIG. 3B is a 3D pattern of the first antenna 11, and (b) in FIG. 3B is a pattern of the first antenna 11 on an XOZ plane. FIG. 3C is a 2D pattern of the first antenna after the tuning stub is loaded in the antenna system in FIG. 1B, where (a) in FIG. 3C is a 3D pattern of the first antenna 11, and (b) in FIG. 3C is a pattern of the first antenna 11 on an XOZ plane. Both (b) in FIG. 3B and (b) in FIG. 3C show a pattern (represented by "0_pattern (f=2.45)" in the figure) of the first antenna 11 at 2.45 GHz before the tuning stub 13 is loaded, and a pattern (represented by "T_pattern (f=2.45)" in the figure) of the first antenna 11 at 2.45 GHz after the tuning stub 13 is loaded.

As shown in FIG. 3A, before the tuning stub 13 is loaded, the pattern of the first antenna 11 on the XOZ plane is a standard vertical polarization dipole pattern. As shown in FIG. 3B, after the tuning stub 13 is loaded on the first radiation arm 111, the pattern of the first antenna 11 is rotated anticlockwise, and correspondingly, an equivalent current path of the first antenna 11 shown in (b) in FIG. 2 is rotated. Similarly, as shown in FIG. 3C, after the tuning stub 13 is loaded on the second radiation arm 112, the pattern of the first antenna 11 is rotated anticlockwise, and correspondingly, an equivalent current path of the first antenna 11 shown in (c) in FIG. 2 is rotated.

Figure 4A:
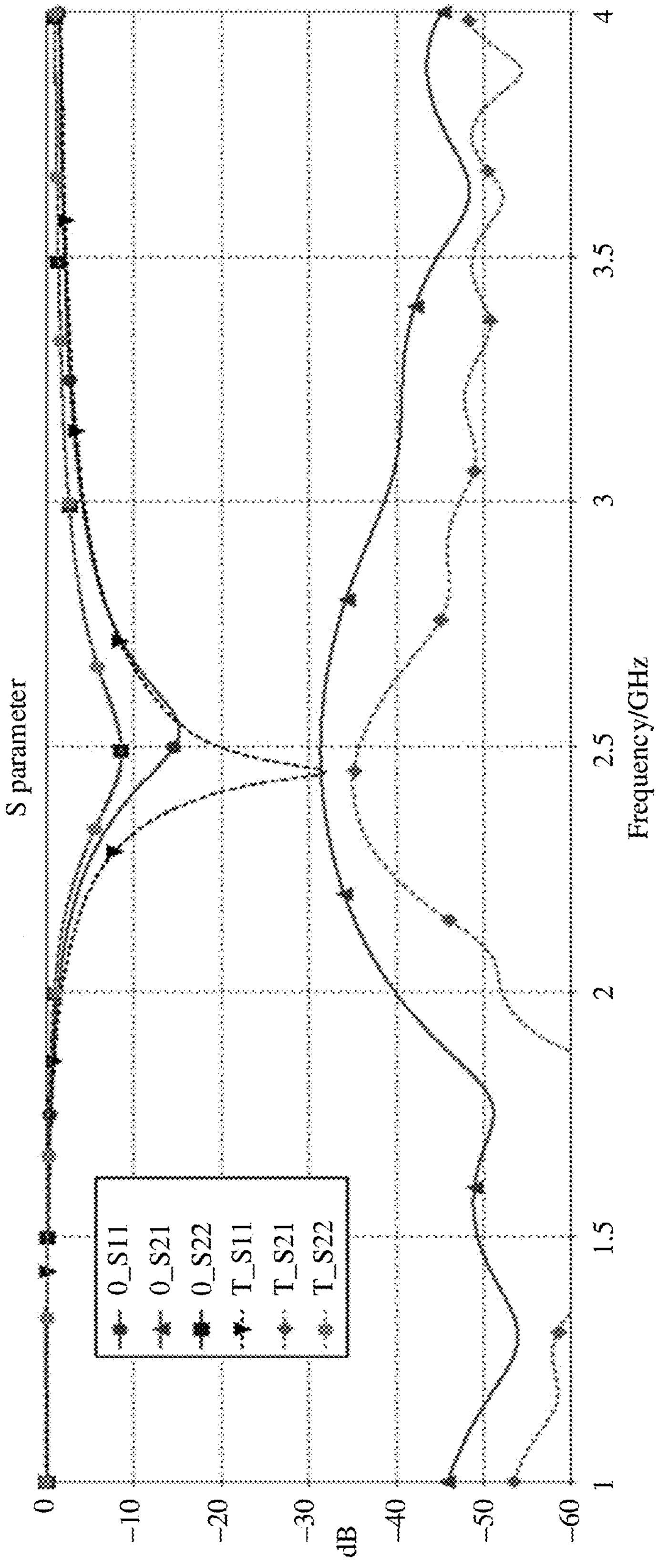
FIG. 4(*a*) and FIG. 4(*b*) are a diagram of performance simulation curves of an S parameter and antenna efficiency of the antenna system in FIG. 1A before and after a tuning stub is loaded in the antenna system.
Figure 4B:
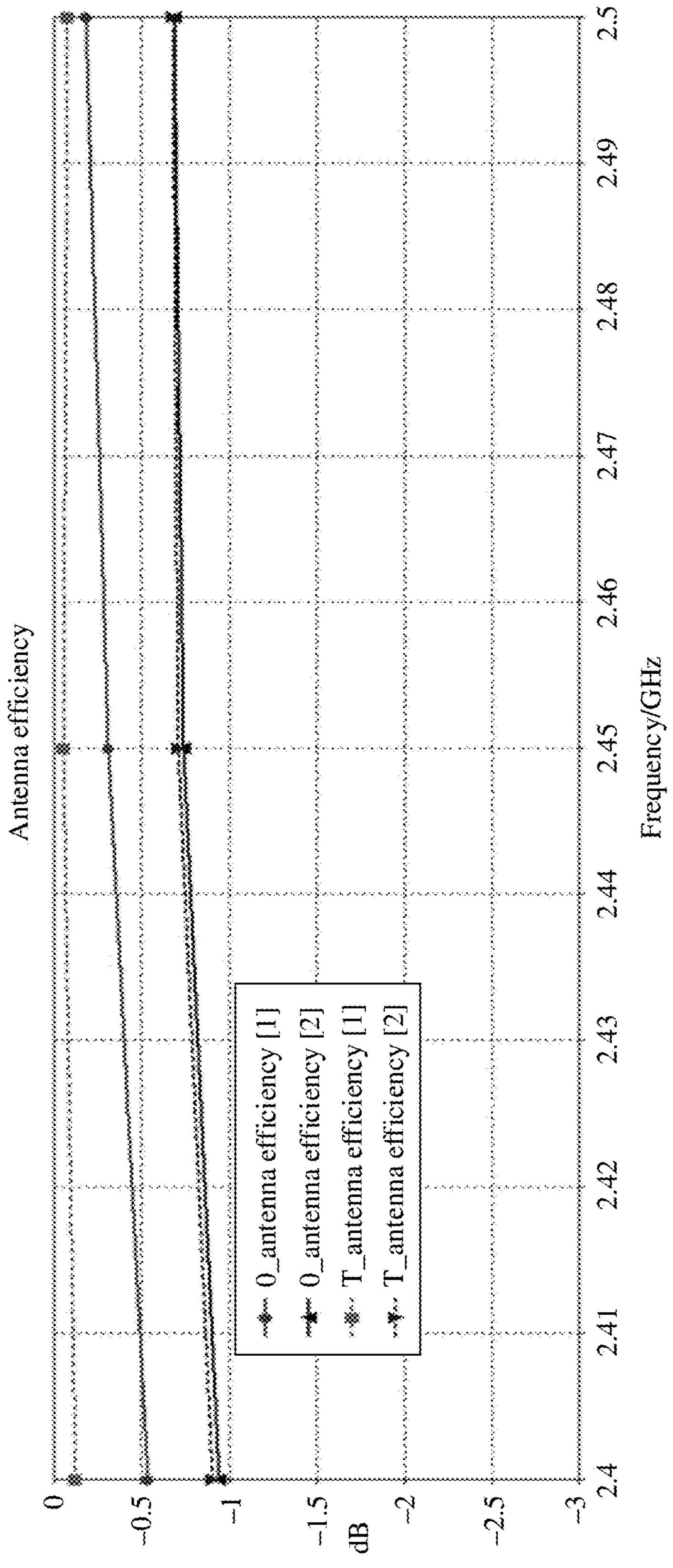
Figure 5A:
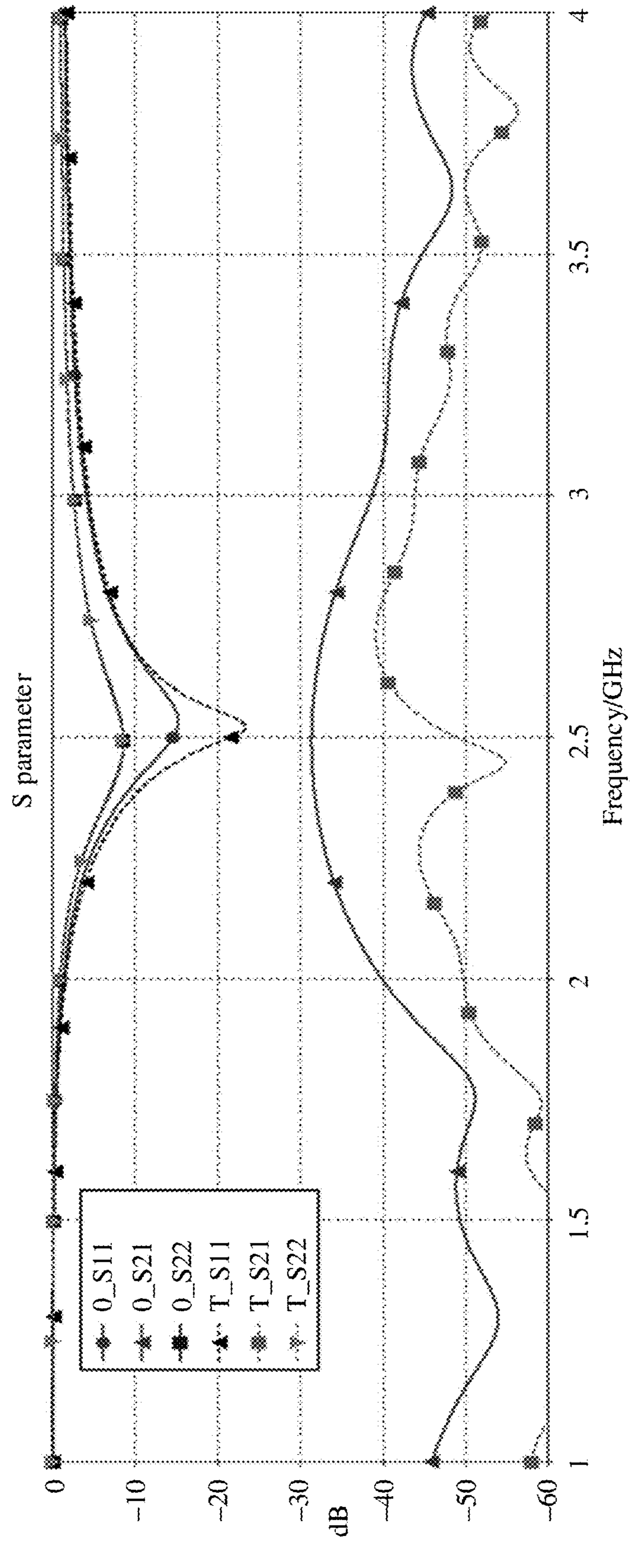
FIG. 5(*a*) and FIG. 5(*b*) are a diagram of simulation curves of an S parameter and antenna efficiency of the antenna system in FIG. 1B before and after a tuning stub is loaded in the antenna system.
Figure 5B:
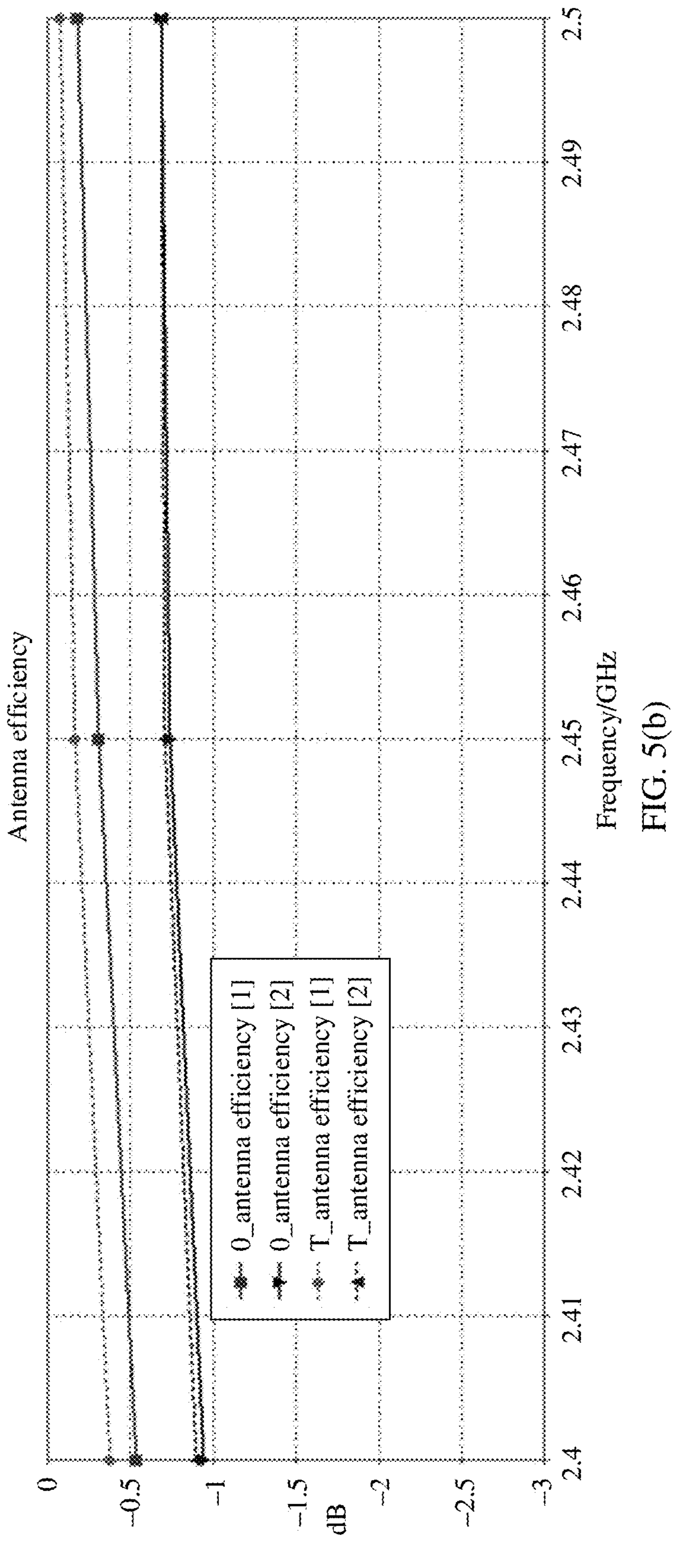

FIG. 4(*a*) and FIG. 4(*b*) are a diagram of performance simulation curves of an S parameter and antenna efficiency of the antenna system in FIG. 1A before and after the tuning stub is loaded in the antenna system. FIG. 5(*a*) and FIG. 5(*b*) are a diagram of simulation curves of an S parameter and antenna efficiency of the antenna system in FIG. 1B before and after the tuning stub is loaded in the antenna system. The S parameter of the antenna system may include S11, S22, S12, and S21. S11 represents a port reflection coefficient of a first antenna in the antenna system, S22 represents a port reflection coefficient of a second antenna in the antenna system, S12 represents a transmission coefficient/isolation from the first antenna to the second antenna, and S21 represents a transmission coefficient/isolation from the second antenna to the first antenna. If the antenna system is a reciprocal network, S12=S21, the example antenna systems in embodiments of this application are reciprocal networks. In FIG. 4(*a*) and FIG. 4(*b*) and FIG. 5(*a*) and FIG. 5(*b*), "0_S11", "0_S21", and "0_S22" represent performance simulation curves of the S parameter of the antenna system before the tuning stub is loaded. "T_S11", "T_S21", and "T_S22" represent performance simulation curves of the S parameter of the antenna system after the tuning stub is loaded. "0_antenna efficiency [1]" represents a performance simulation curve of the antenna efficiency of the first antenna 11 before the tuning stub is loaded, and "0_antenna efficiency [2]" represents a performance simulation curve of the antenna efficiency of the second antenna 12 before the tuning stub is loaded. "T_antenna efficiency [1]" represents a performance simulation curve of the antenna efficiency of the first antenna 11 after the tuning stub is loaded; and "T_antenna efficiency [2]" represents a performance simulation curve of the antenna efficiency of the second antenna 12 after the tuning stub is loaded.

As shown in FIG. 4(*a*), after the tuning stub 13 is loaded on the first radiation arm 111, isolation between the first antenna 11 and the second antenna 12 is increased by approximately 5 decibels (dB) at a center working frequency (2.45 GHZ), to more than 35 dB, and an input return loss S11 of the first antenna 11 is decreased. Refer to FIG. 4(*b*). The antenna efficiency of the first antenna 11 is not reduced, but is improved, and an output return loss S22 of the first antenna 11 and the antenna efficiency of the second antenna 12 remain unchanged.

As shown in FIG. 5(*a*), after the tuning stub 13 is loaded on the second radiation arm 112, isolation between the first antenna 11 and the second antenna 12 is increased by more than 15 dB, to more than 45 dB, and an input return loss S11 of the first antenna 11 is decreased. Refer to FIG. 5(*b*). The antenna efficiency of the first antenna 11 is not reduced, but is improved.

It can be seen from FIG. 5(*a*) that, after the tuning stub 13 is loaded on the second radiation arm 112, a "decoupling pit" appears on the S21 curve of the first antenna 11, and isolation on a corresponding frequency band is extremely good. As shown in FIG. 4(*a*), after the tuning stub 13 is loaded on the first radiation arm 111, an increase of isolation is less than an increase of isolation after the tuning stub 13 is loaded on the second radiation arm 112. The main reason is that, after the tuning stub 13 is loaded on the second radiation arm 112, the equivalent current paths of the two antennas are perpendicular to each other, a connection line between maximum current points of the equivalent current paths of the two antennas is perpendicular to the equivalent current path of the first antenna 11, and the equivalent current path of the first antenna 11 is symmetric relative to a perpendicular from the maximum current point of the second antenna 12 to the equivalent current path of the first antenna 11. In this case, an incoming wave component that is of the second antenna 12 and that is received by the first radiation arm 111 of the first antenna 11 and an incoming wave component that is of the second antenna 12 and that is received by the second radiation arm 112 of the first antenna 11 and the tuning stub 13 are equal in amplitude and opposite in phase. The two incoming wave components can be completely canceled when reaching a port of the first antenna 11. Therefore, a "decoupling pit" appears on a corresponding frequency band. After the tuning stub 13 is loaded on the first radiation arm 111, the equivalent current paths of the two antennas are perpendicular to each other, but a connection line between maximum current points of the equivalent current paths of the two antennas is not perpendicular to the equivalent current path of the first antenna 11, and the equivalent current path of the first antenna 11 is not completely symmetric relative to a perpendicular from the maximum current point of the second antenna 12 to the equivalent current path of the first antenna 11. In this case, an incoming wave component that is of the second antenna 12 and that is received by the first radiation arm 111 of the first antenna 11 and the tuning stub 13, and an incoming wave component that is of the second antenna 12 and that is received by the second radiation arm 112 of the first antenna 11 are not completely equal in amplitude and opposite in phase. The two incoming wave components cannot be completely canceled. Therefore, a "decoupling pit" does not appear on a corresponding frequency band.

Embodiment 2

Figure 6:
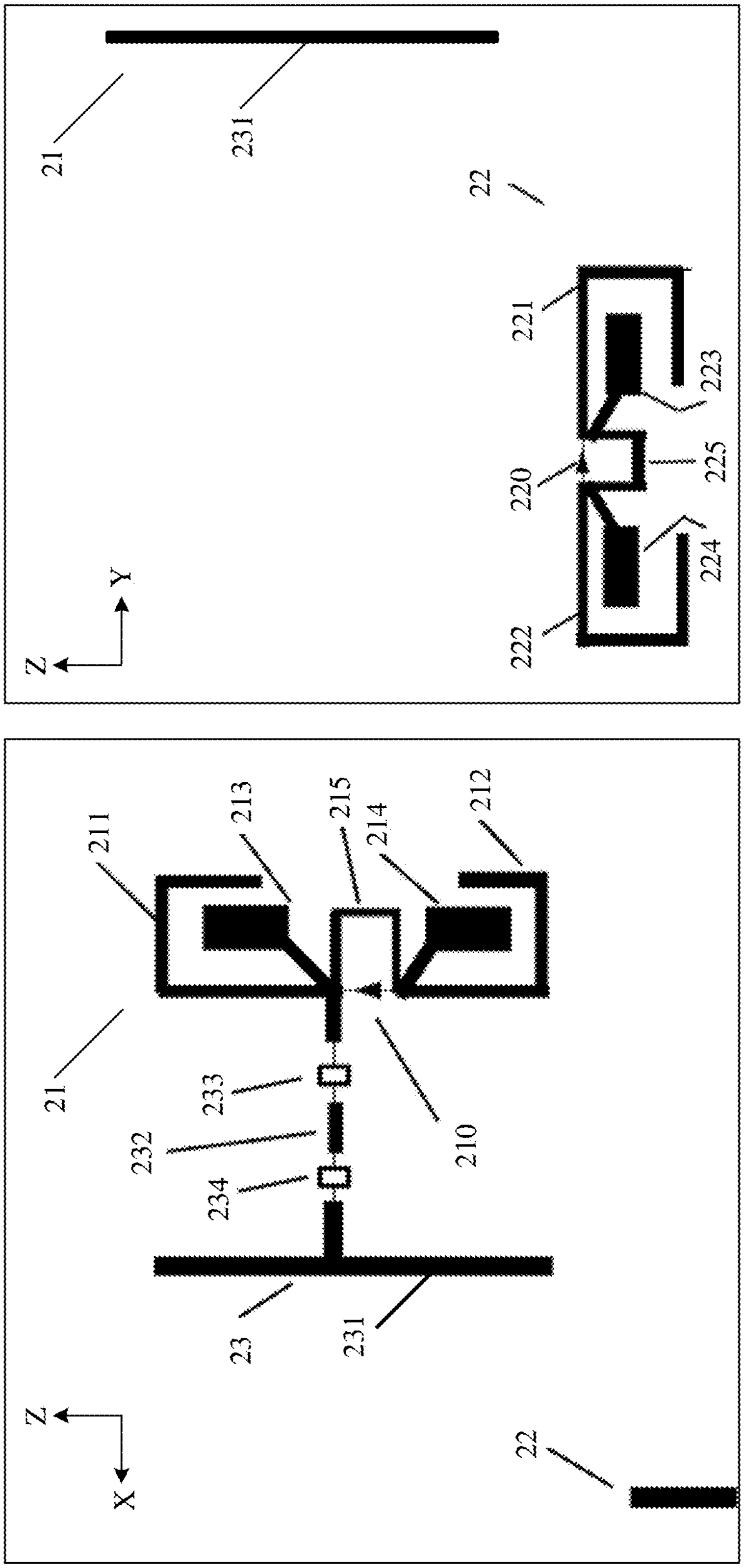
FIG. 6 is a schematic diagram of a structure of another antenna system according to an embodiment of this application.

FIG. 6 is a schematic diagram of a structure of another antenna system according to an embodiment of this application, where (a) in FIG. 6 is a schematic diagram of the antenna system on an XOZ plane, and (b) in FIG. 6 is a schematic diagram of the antenna system on a YOZ plane.

The antenna system includes a first antenna 21, a second antenna 22, and a tuning stub 23. The first antenna 21 and the second antenna 22 are a pair of dipole antennas whose operating frequency bands include a 2.4 GHz frequency band (referred to as a first operating frequency band herein) and a 5 GHz frequency band (referred to as a second operating frequency band herein), and an equivalent current path of the first antenna 21 is perpendicular to an equivalent current path of the second antenna 22 on different planes.

The first antenna 21 may include a first radiation arm 211, a second radiation arm 212, a third radiation arm 213, a fourth radiation arm 214, and a first impedance tuning arm 215. A feed point 210 of the first antenna 21 is located between two ends of the first impedance tuning arm 215.

An operating frequency band of each of the first radiation arm 211 and the second radiation arm 212 is the first operating frequency band, and the first radiation arm 211 and the second radiation arm 212 are connected to the two ends of the first impedance tuning arm 215. An electrical length of each of the first radiation arm 211 and the second radiation arm 212 may be $0.25\lambda_1$, and $\lambda_1$ is a wavelength corresponding to a center operating frequency (2.45 GHz) of the first operating frequency band. A current flows from the second radiation arm 212 to the first radiation arm 211.

An operating frequency band of each of the third radiation arm 213 and the fourth radiation arm 214 is the second operating frequency band, and the third radiation arm 213 and the fourth radiation arm 214 are connected to the two ends of the first impedance tuning arm 215. An electrical length of each of the third radiation arm 213 and the fourth radiation arm 214 may be $0.25\lambda_2$, and $\lambda_2$ is a wavelength corresponding to a center operating frequency (5.5 GHZ) of the second operating frequency band. A current flows from the fourth radiation arm 214 to the third radiation arm 213.

The first radiation arm 211 and the second radiation arm 212 each may form a semi-annular bending structure, the third radiation arm 213 may be located in an area enclosed by the first radiation arm 211, and the fourth radiation arm 214 may be located in an area enclosed by the second radiation arm 212, to save space. The third radiation arm 213 and the fourth radiation arm 214 each may include a rectangular supporting arm and a linear supporting arm that connects the rectangular supporting arm to the feed point 210, and the rectangular supporting arm is used to further save space.

Similar to a structure of the first antenna 21, the second antenna 22 may include a fifth radiation arm 221, a sixth radiation arm 222, a seventh radiation arm 223, an eighth radiation arm 224, and a second impedance tuning arm 225, and a feed point 220 of the second antenna 22 is located between two ends of the second impedance tuning arm 225.

An operating frequency band of each of the fifth radiation arm 221 and the sixth radiation arm 222 is the first operating frequency band, the fifth radiation arm 221 and the sixth radiation arm 222 are connected to the two ends of the second impedance tuning arm 225, and an electrical length of each of the fifth radiation arm 221 and the sixth radiation arm 222 may be 0.25° C. A current flows from the sixth radiation arm 222 to the fifth radiation arm 221.

An operating frequency band of each of the seventh radiation arm 223 and the eighth radiation arm 224 is the second operating frequency band, the seventh radiation arm 223 and the eighth radiation arm 224 are connected to the two ends of the second impedance tuning arm 225, and an electrical length of each of the seventh radiation arm 223 and the eighth radiation arm 224 may be $0.25\lambda_2$. A current flows from the eighth radiation arm 224 to the seventh radiation arm 223.

The fifth radiation arm 221 and the sixth radiation arm 222 each may form a semi-annular bending structure, the seventh radiation arm 223 may be located in an area enclosed by the fifth radiation arm 221, and the eighth radiation arm 224 may be located in an area enclosed by the sixth radiation arm 222, to save space. The fifth radiation arm 221 and the sixth radiation arm 222 each may include a rectangular supporting arm and a linear supporting arm that connects the rectangular supporting arm to the feed point 220, and the rectangular supporting arm is used to further save space.

Each radiation arm of the first antenna 21 may be located on one side of the feed point 210, and the tuning stub 23 may be located on the other side of the feed point 210. In this way, impact of the tuning stub 23 on an operating frequency band of the first antenna 21 can be reduced, and tuning effect can be improved. Similar to the antenna system in Embodiment 1, the tuning stub 23 may be connected to a position that is on the first radiation arm 211 or the second radiation arm 212 and that is close to the feed point 210. For example, as shown in FIG. 6, the tuning stub 23 may be connected to one end that is of the first radiation arm 211 and that is close to the feed point 210, that is, may be connected to the feed point 210, to improve tuning effect.

A shape of the tuning stub 23 may be set based on available space of the antenna. Herein, for example, the tuning stub 23 is in a T shape, to save horizontal space (namely, space in an X-axis direction in FIG. 6). Specifically, the tuning stub 23 may include a first stub 231 and a second stub 232 that are perpendicular to each other. One end of the second stub 232 may be connected to a middle part of the first stub 231, and the other end of the second stub 232 may be connected to the feed point 210. The second stub 232 may be specifically connected to a midpoint or near a midpoint of the first stub 231.

The tuning stub 23 may be parallel to a first plane, to achieve better tuning effect. The first plane is perpendicular to the equivalent current path of the second antenna 22. The first plane in FIG. 6 is a plane parallel to the XOZ plane.

The entire tuning stub 23 is configured to adjust isolation of the two antennas on the first operating frequency band, and a part of the tuning stub 23 is configured to adjust isolation of the two antennas on the second operating frequency band.

Similarly, a tuning element may be loaded on each radiation arm of the antenna system, and an operating frequency of the radiation arm is tuned by using the tuning element, to reduce an antenna length. For example, no tuning element is loaded on the radiation arm of each of the first antenna 21 and the second antenna 22, physical lengths of the first radiation arm 211, the second radiation arm 212, the fifth radiation arm 221, and the sixth radiation arm 222 are all 27 mm, and sizes of rectangular supporting arms of the third radiation arm 213, the fourth radiation arm 214, the seventh radiation arm 223, and the eighth radiation arm 224 are all 8 mm*4.5 mm. A first tuning element 233 and a second tuning element 234 are disposed on the tuning stub 23 at an interval. The first tuning element 233 is located between the second tuning element 234 and the feed point 210. A physical length of the first stub 231 is 19 mm, a sum of physical lengths of stub segments in the second stub 232 is 8 mm, a physical length of a stub between the first tuning element 233 and the second tuning element 234 is 4 mm, the first tuning element 233 is a resistor of 0Ω, and the second tuning element 234 is a band-stop filter. The band-stop filter is formed by connecting a 0.35 pF capacitor and a 2.2 nH inductor in parallel.

An electrical length of the entire tuning stub 23 may be approximately $0.25\lambda_1$, and may be specifically greater than $0.25\lambda_1$ and less than $0.35\lambda_1$. A stub between the first tuning element 233 and the second tuning element 234 on the tuning stub 23 and the first tuning element 233 are used to adjust isolation of the two antennas on the second operating frequency band. A sum of an electrical length of the stub and an electrical length of the first tuning element 233 may be approximately $0.25\lambda_2$, and may be specifically greater than $0.25\lambda_2$ and less than $0.35\lambda_2$.

Figure 7:
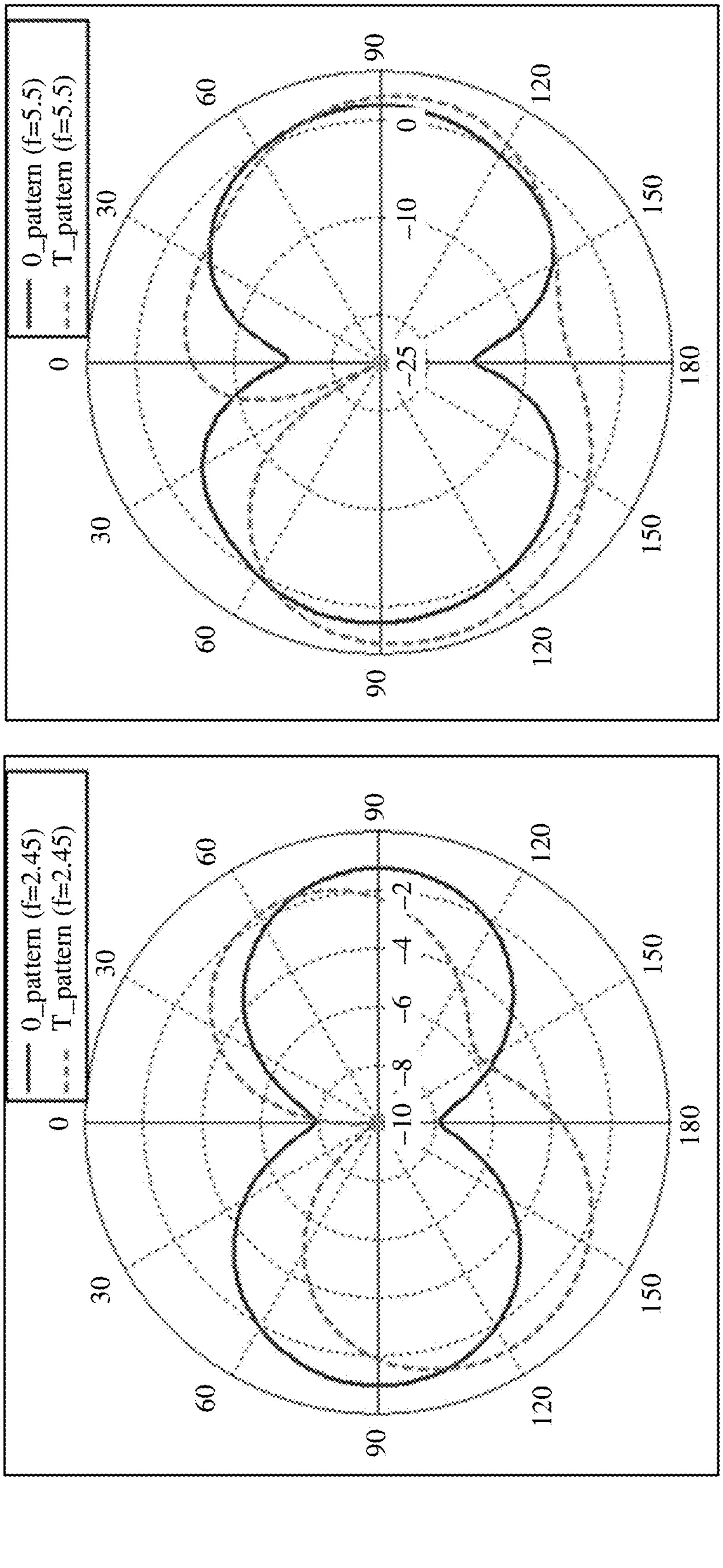
FIG. 7 is a pattern of a first antenna on an XOZ plane before and after a tuning stub is loaded in the antenna system in FIG. 6.

FIG. 7 is a pattern of the first antenna on an XOZ plane before and after the tuning stub is loaded in the antenna system in FIG. 6, where (a) in FIG. 7 is a pattern of the first antenna 21 at 2.45 GHz, and (b) in FIG. 7 is a pattern of the first antenna 21 at 5.5 GHZ. In (a) in FIG. 7, "0_pattern (f=2.45)" represents a pattern of the first antenna 21 at 2.45 GHz before the tuning stub 23 is loaded, and "T_pattern (f=2.45)" represents a pattern of the first antenna 21 at 2.45 GHz after the tuning stub 23 is loaded. In (b) in FIG. 7, "0_pattern (f=5.5)" represents a pattern of the first antenna 21 at 5.5 GHz before the tuning stub 23 is loaded, and "T_pattern (f=5.5)" represents a pattern of the first antenna 21 at 5.5 GHz after the tuning stub 23 is loaded.

As shown in (a) and (b) in FIG. 7, the patterns of the first antenna 21 at the two frequencies are rotated anticlockwise, to achieve tuning effect similar to that in Embodiment 1. The pattern is rotated because the equivalent current path of the first antenna 21 is changed. A main principle of the rotation is similar to that in Embodiment 1, and details are not described herein again.

Figure 8A:
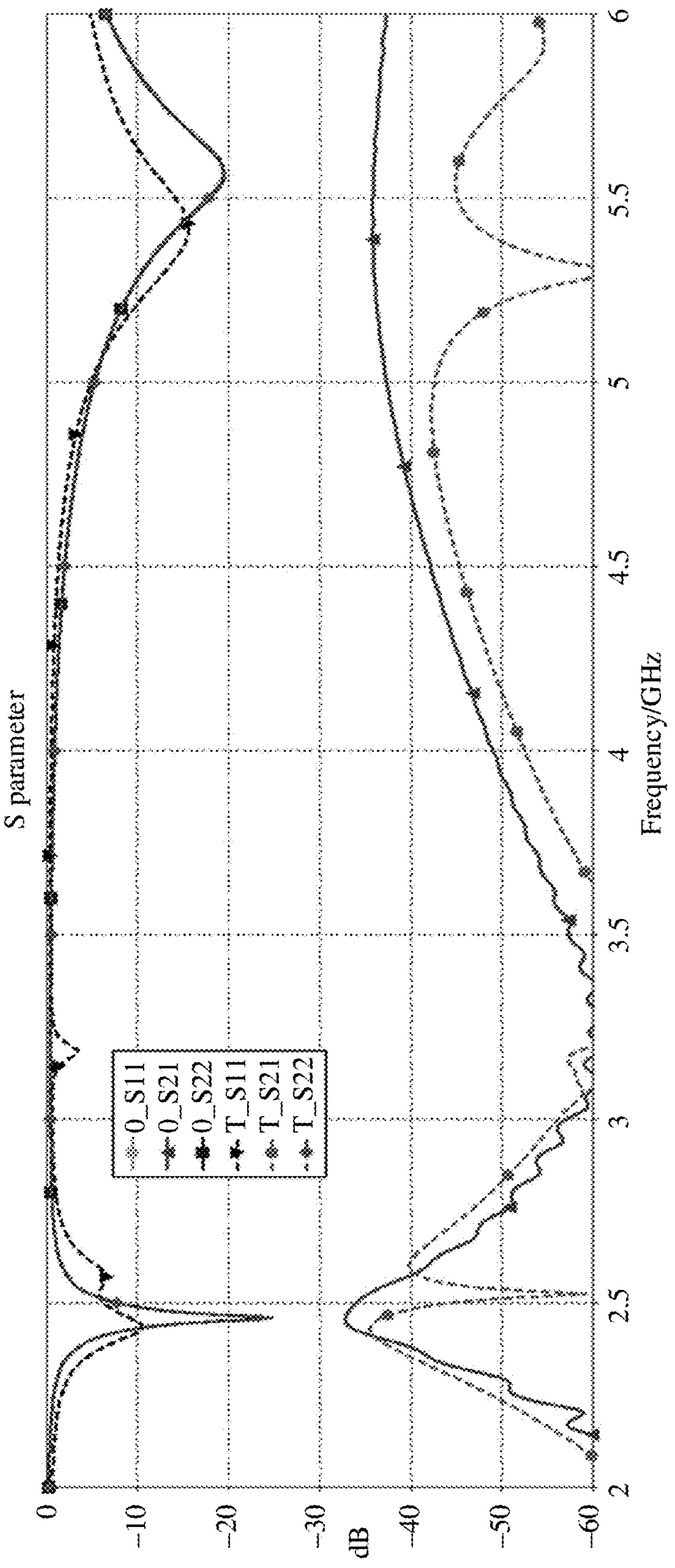
FIG. 8(*a*) and FIG. 8(*b*) are a diagram of performance simulation curves of an S parameter and antenna efficiency of the antenna system in FIG. 6 before and after a tuning stub is loaded in the antenna system.
Figure 8B:
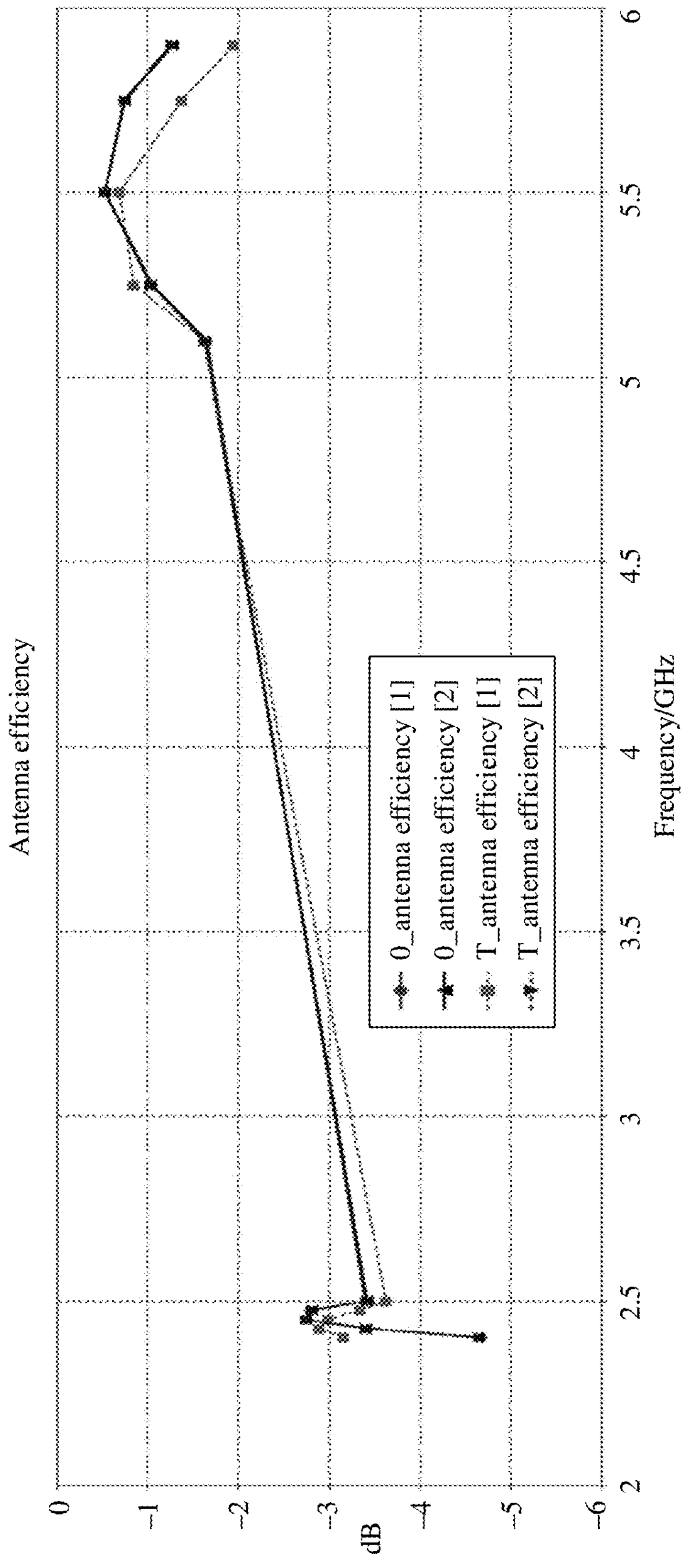

FIG. 8(*a*) and FIG. 8(*b*) are a diagram of performance simulation curves of an S parameter and antenna efficiency of the antenna system in FIG. 6 before and after the tuning stub is loaded in the antenna system, where "0_S11", "0_S21", and "0_S22" represent performance simulation curves of the S parameter of the antenna system before the tuning stub is loaded. "T_S11", "T_S21", and "T_S22" represent performance simulation curves of the S parameter of the antenna system after the tuning stub is loaded. "0_antenna efficiency [1]" represents a performance simulation curve of the antenna efficiency of the first antenna 21 before the tuning stub is loaded, and "0_antenna efficiency [2]" represents a performance simulation curve of the antenna efficiency of the second antenna 22 before the tuning stub is loaded. "T_antenna efficiency [1]" represents a performance simulation curve of the antenna efficiency of the first antenna 21 after the tuning stub is loaded, and "T_antenna efficiency [2]" represents a performance simulation curve of the antenna efficiency of the second antenna 22 after the tuning stub is loaded.

As shown in FIG. 8(*a*), after the tuning stub 23 is loaded on the first antenna 21, isolation between the first antenna 21 and the second antenna 22 on the first operating frequency band is increased by approximately 4 dB, to more than 38 dB, and isolation between the first antenna 21 and the second antenna 22 on the second operating frequency band is increased by approximately 10 dB, to more than 45 dB. An input return loss S11 of the first antenna 21 is slightly increased. Correspondingly, refer to FIG. 8(*b*). The antenna efficiency of the first antenna 21 is slightly reduced. Relative to an increase in isolation, the antenna efficiency is slightly changed. In addition, an output return loss S22 of the first antenna 21 and the antenna efficiency of the second antenna 22 remain unchanged.

Embodiment 3

Figure 9A:
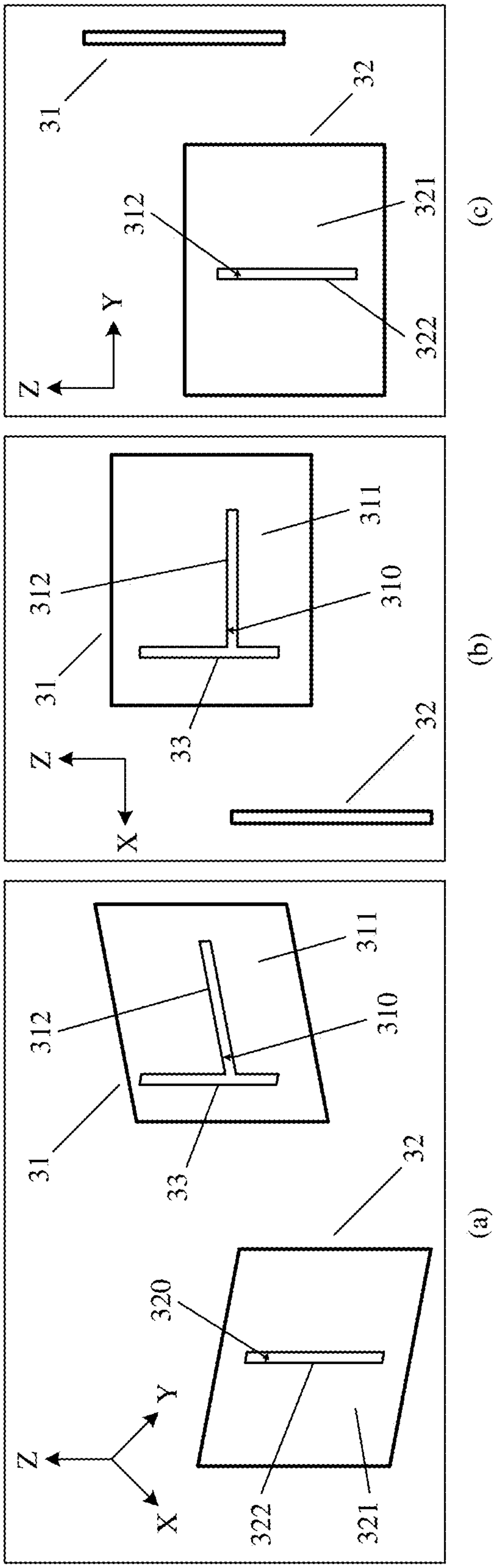
FIG. 9A and FIG. 9B are schematic diagrams of structures of some other antenna systems according to an embodiment of this application.

FIG. 9A is a schematic diagram of a structure of another antenna system according to an embodiment of this application, where (a) in FIG. 9A is a schematic diagram of the antenna system at a specific angle, (b) in FIG. 9A is a schematic diagram of the antenna system on an XOZ plane, and (c) in FIG. 9A is a schematic diagram of the antenna system on a YOZ plane.

The antenna system includes a first antenna 31, a second antenna 32, and a tuning stub 33. The first antenna 31 and the second antenna 32 are a pair of slot antennas whose operating frequency band is a 2.4 GHz frequency band. The first antenna 31, the second antenna 32, and the tuning stub 33 are all in a straight line shape, and the first antenna 31 and the second antenna 32 are perpendicular to each other on different planes.

The first antenna 31 may include a first printed circuit board (printed circuit board, PCB) 311 and a first slot 312, and a feed point 310 of the first antenna 31 is located at an end of the first slot 312. The second antenna 32 may include a second PCB 321 and a second slot 322, and a feed point 320 of the second antenna 32 is located at an end of the second slot 322. An electrical length of each of the first slot 312 and the second slot 322 may be 0.5λ, where λ is a wavelength corresponding to a center operating frequency (2.45 GHZ) of the 2.4 GHz frequency band.

The tuning stub 33 is located on the first PCB 311, and may be perpendicular to the first slot 312, to improve tuning effect.

In an optional implementation, as shown in FIG. 9A, the tuning stub 33 is a slot, and is located at an end that is of the first slot 312 and that is close to the second antenna 32. An electrical length of the tuning stub 33 may be approximately 0.5λ. A spacing from an end that is of the tuning stub 33 and that faces a current direction of the first antenna 31 to a connection point between the tuning stub 33 and the first slot 312 may be greater than a spacing from an end that is of the tuning stub 33 and that is back to the current direction of the first antenna 31 to the connection point between the tuning stub 33 and the first slot 312, to achieve better tuning effect.

Figure 9B:
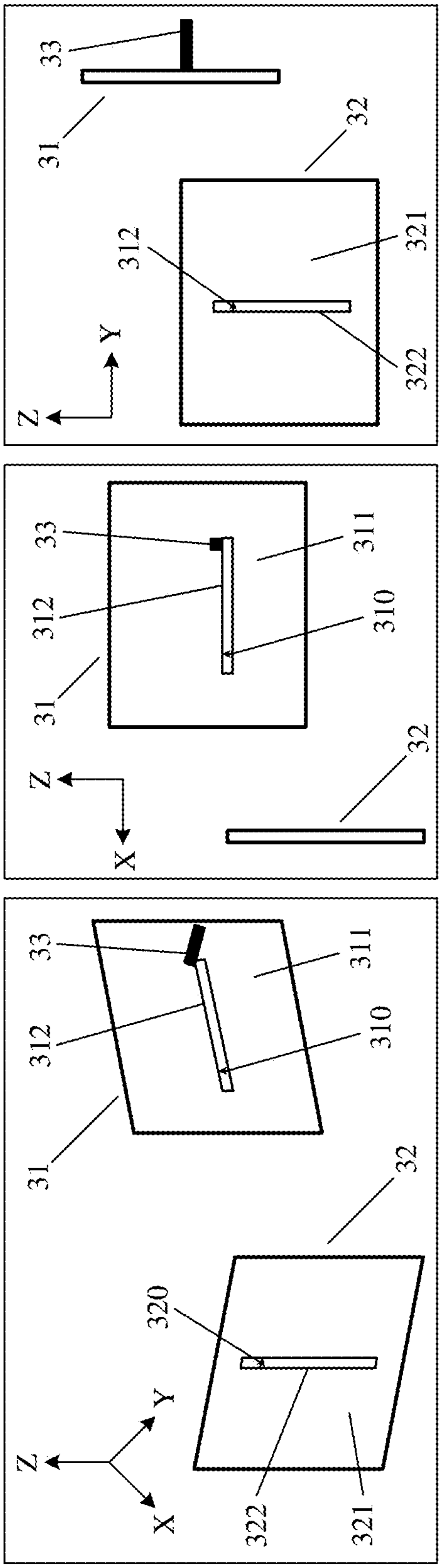

In another optional implementation, as shown in (a) to (c) in FIG. 9B, the tuning stub 33 is a radiation arm, and an electrical length of the tuning stub 33 may be approximately 0.25λ. The tuning stub 33 may be disposed on an edge of the first slot 312, and forms any included angle with the first PCB 311. For example, as shown in FIG. 9B, the tuning stub 33 is disposed at an end that is of the first slot 312 and that is away from the second antenna 32, a slot of the second antenna 32 is located at one side of the first slot 312, and the tuning stub 33 is located at an edge position on the other side of the first slot 312, to achieve better tuning effect.

Figure 10:
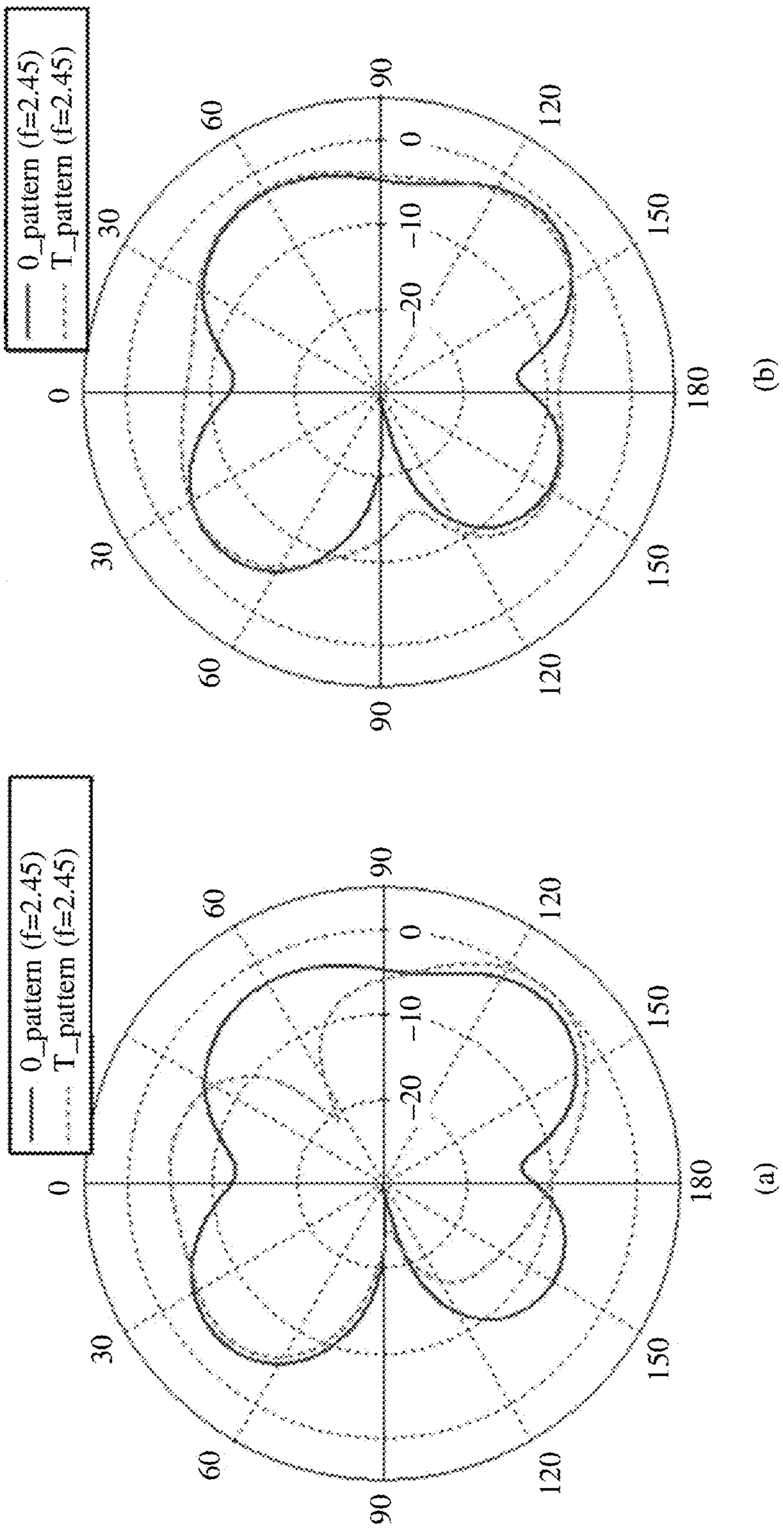
FIG. 10 is a pattern of a first antenna on an XOZ plane before and after a tuning stub is loaded in the antenna system in FIG. 9A and FIG. 9B.

FIG. 10 is a pattern of the first antenna on an XOZ plane before and after the tuning stub is loaded in the antenna system in FIG. 9A and FIG. 9B, where (a) in FIG. 10 is a pattern of the first antenna 31 in FIG. 9A at 2.45 GHZ, and (b) in FIG. 10 is a pattern of the first antenna 31 in FIG. 9B at 2.45 GHz. "0_pattern (f=2.45)" represents a pattern of the first antenna 31 at 2.45 GHz before the tuning stub 33 is loaded, and "T_pattern (f=2.45)" represents a pattern of the first antenna 31 at 2.45 GHz after the tuning stub 33 is loaded.

As shown in (a) and (b) in FIG. 10, the patterns of the first antenna 31 in FIG. 9A and FIG. 9B are both changed, to achieve tuning effect similar to that in Embodiment 1. The pattern is changed because an equivalent current path of the first antenna 31 is changed. A main principle of the change is similar to that in Embodiment 1, and details are not described herein again.

Figure 11A:
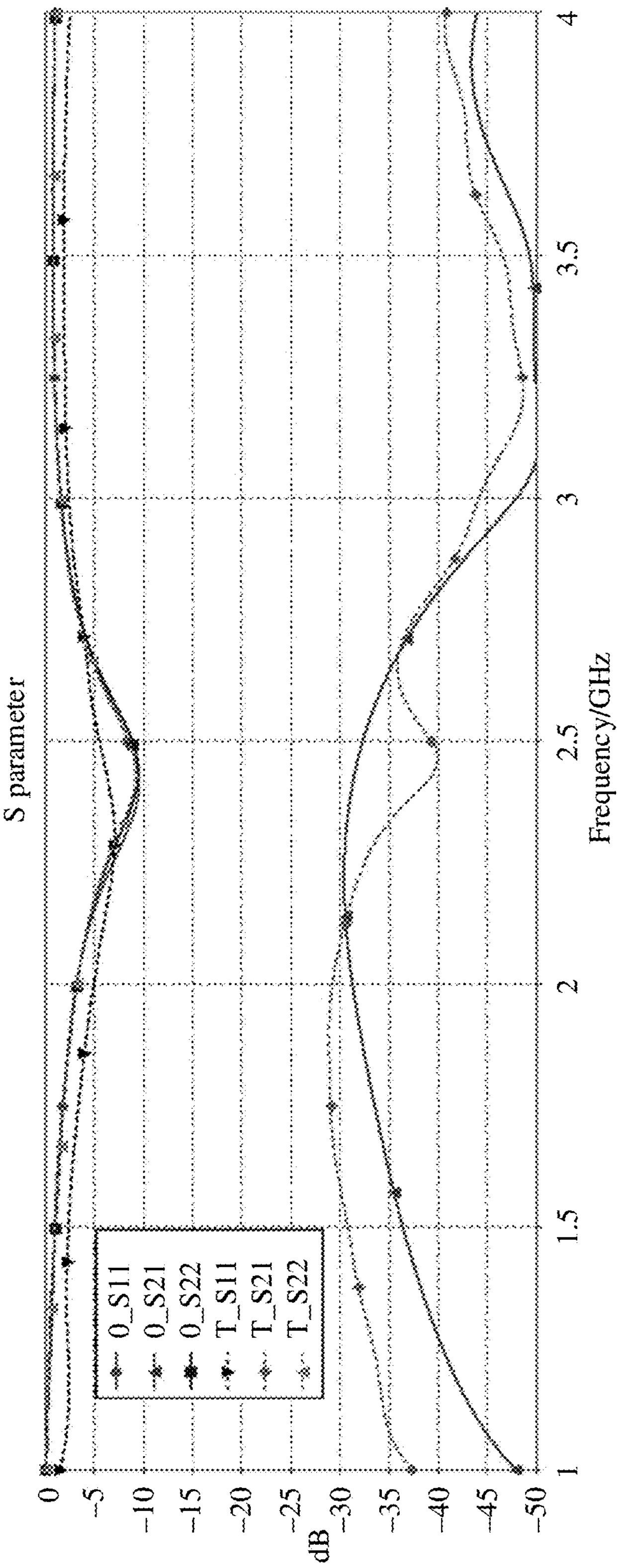
FIG. 11(*a*) and FIG. 11(*b*) are a diagram of performance simulation curves of an S parameter and antenna efficiency of the antenna system in FIG. 9A before and after a tuning stub is loaded in the antenna system.
Figure 11B:
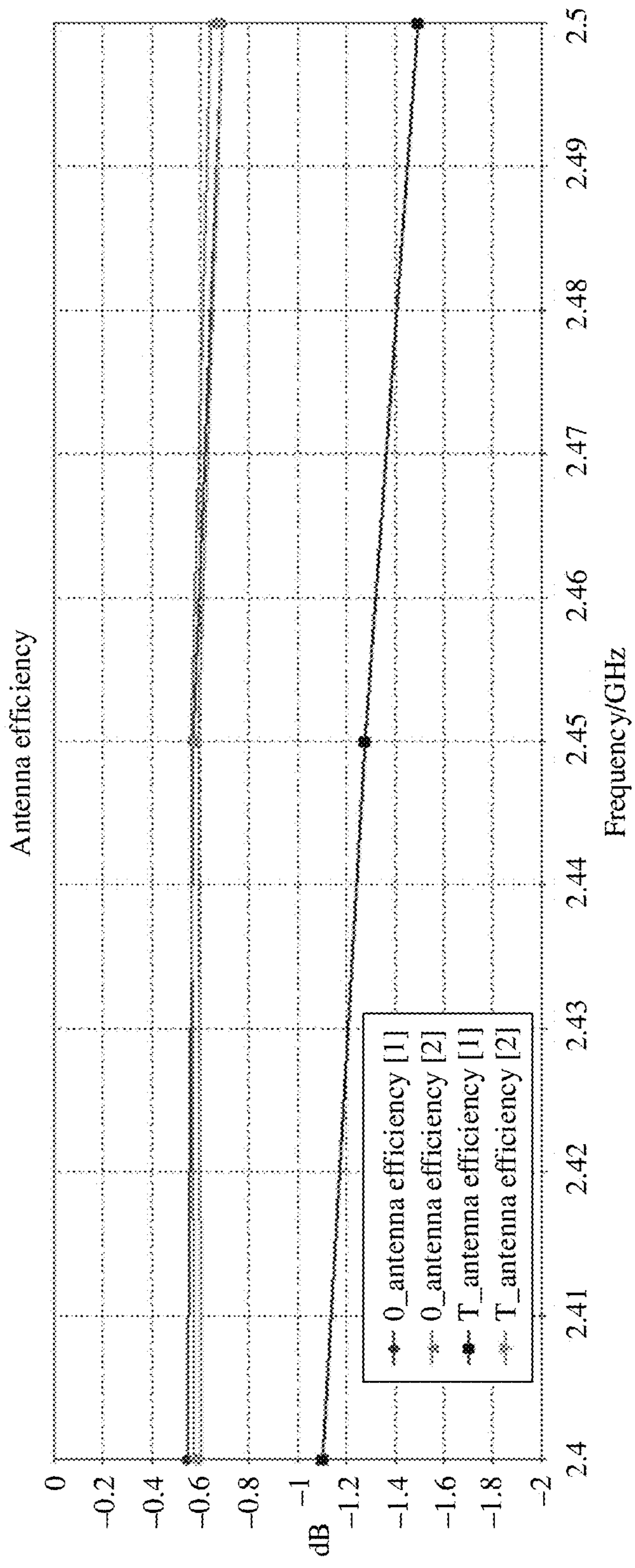
Figure 12A:
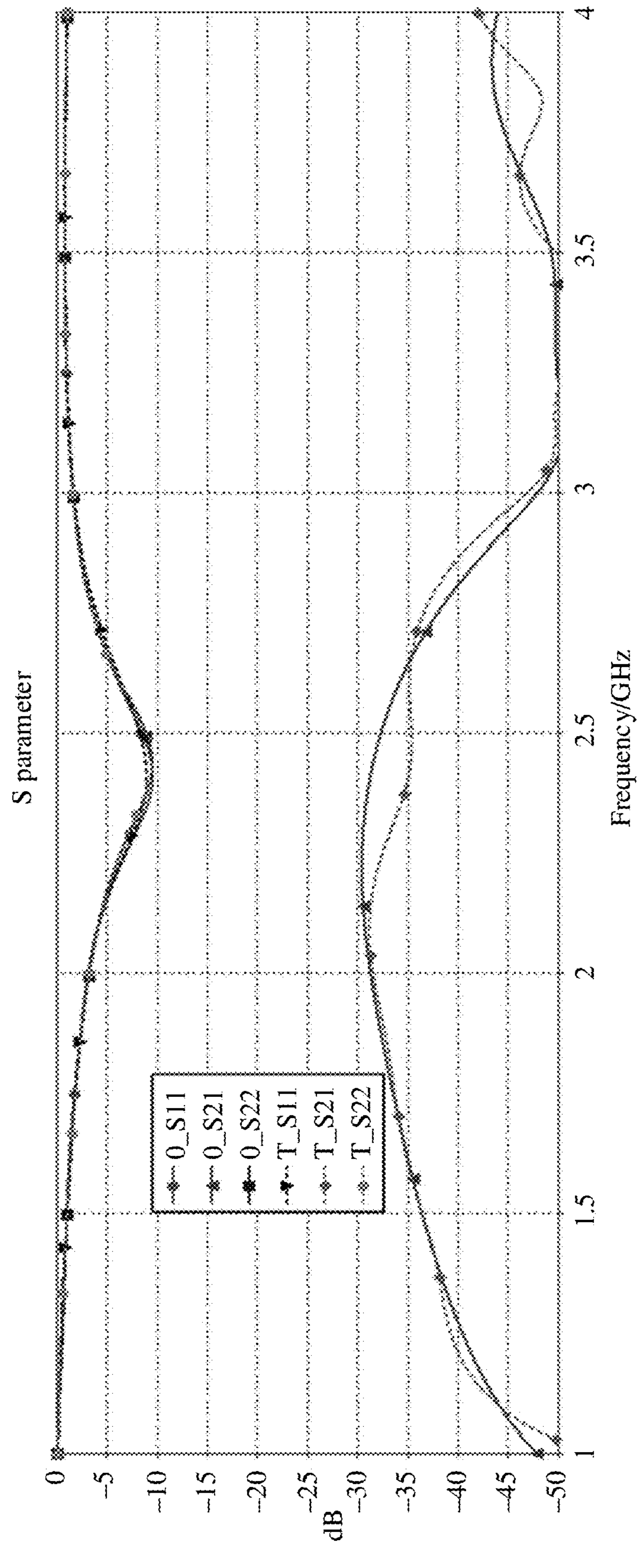
FIG. 12(*a*) and FIG. 12(*b*) are a diagram of performance simulation curves of an S parameter and antenna efficiency of the antenna system in FIG. 9B before and after a tuning stub is loaded in the antenna system.
Figure 12B:
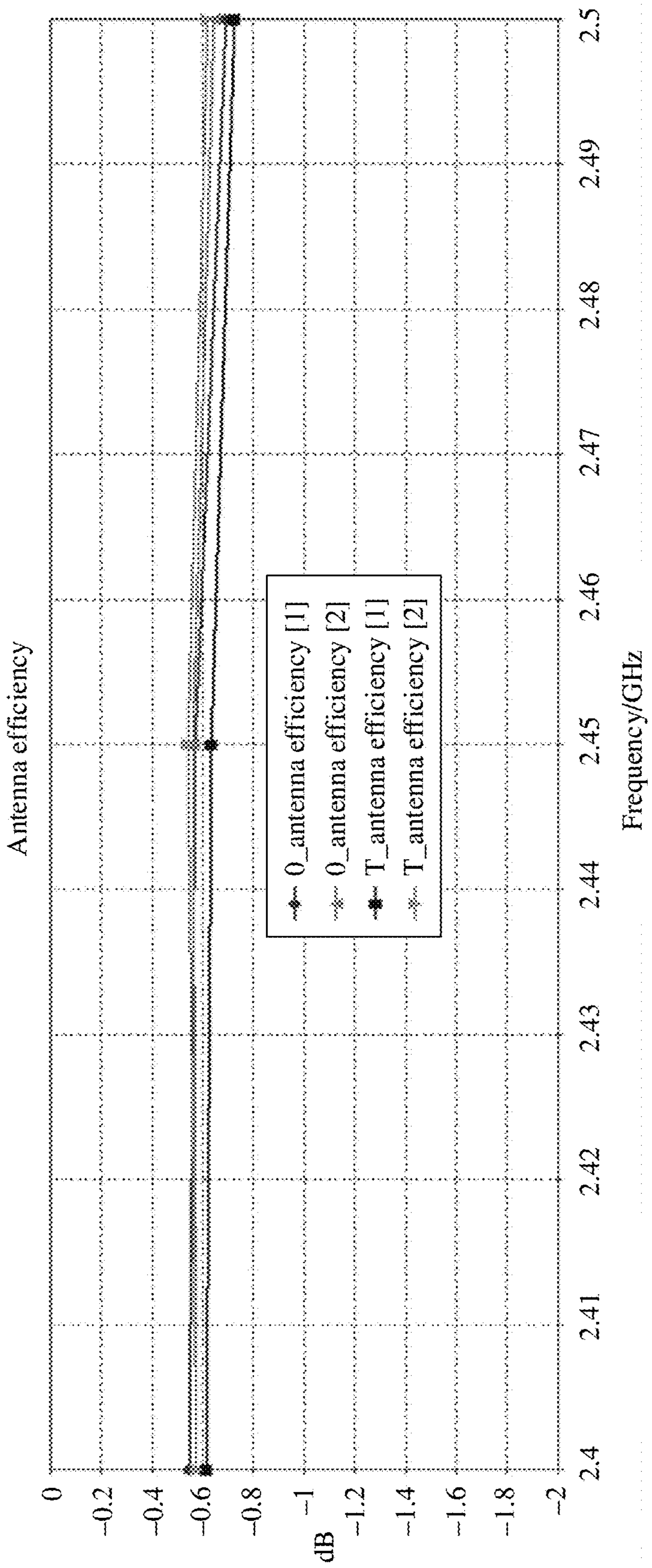

FIG. 11(*a*) and FIG. 11(*b*) are a diagram of performance simulation curves of an S parameter and antenna efficiency of the antenna system in FIG. 9A before and after a tuning stub is loaded in the antenna system. FIG. 12(*a*) and FIG. 12(*b*) are a diagram of performance simulation curves of an S parameter and antenna efficiency of the antenna system in FIG. 9B before and after a tuning stub is loaded in the antenna system. "0_S11", "0_S21", and "0_S22" represent performance simulation curves of the S parameter of the antenna system before the tuning stub is loaded. "T_S11", "T_S21", and "T_S22" represent performance simulation curves of the S parameter of the antenna system after the tuning stub is loaded. "0_antenna efficiency [1]" represents a performance simulation curve of the antenna efficiency of the first antenna 31 before the tuning stub is loaded, and "0_antenna efficiency [2]" represents a performance simulation curve of the antenna efficiency of the second antenna 32 before the tuning stub is loaded. "T_antenna efficiency [1]" represents a performance simulation curve of the antenna efficiency of the first antenna 31 after the tuning stub is loaded. "T_antenna efficiency [2]" represents a performance simulation curve of the antenna efficiency of the second antenna 32 after the tuning stub is loaded.

As shown in FIG. 11(*a*), after the tuning stub 33 is loaded on the first antenna 31, isolation between the first antenna 31 and the second antenna 32 is increased by approximately 8 dB, to approximately 40 dB. An input return loss S11 of the first antenna 31 is slightly increased. Correspondingly, refer to FIG. 11(*b*). The antenna efficiency of the first antenna 31 is slightly reduced. Relative to an increase in isolation, the antenna efficiency is slightly changed. In addition, an output return loss S22 of the first antenna 31 and the antenna efficiency of the second antenna 32 remain unchanged.

As shown in FIG. 12(*a*), after the tuning stub 33 is loaded on the first antenna 31, isolation between the first antenna 31 and the second antenna 32 is increased by approximately 3 dB, to approximately 35 dB. An input return loss S11 of the first antenna 31 is slightly changed. Correspondingly, refer to FIG. 12(*b*). The antenna efficiency of the first antenna 31 is slightly changed. In addition, an output return loss S22 of the first antenna 31 and the antenna efficiency of the second antenna 32 remain unchanged.

The foregoing is described by using an example in which the slot in the antenna system is a closed slot. In this embodiment, the slot in the antenna system may alternatively be an open slot whose electrical length is 0.25), or a slot of another length in which a tuning element is loaded. The loaded tuning stub may alternatively be in another shape. This is not particularly limited in this embodiment.

The foregoing embodiments describe several antenna systems in which the equivalent current paths of the first antenna and the second antenna are perpendicular to each other as examples. The following describes several antenna systems in which the equivalent current paths of the first antenna and the second antenna are not perpendicular to each other as examples.

Embodiment 4

Figure 13:
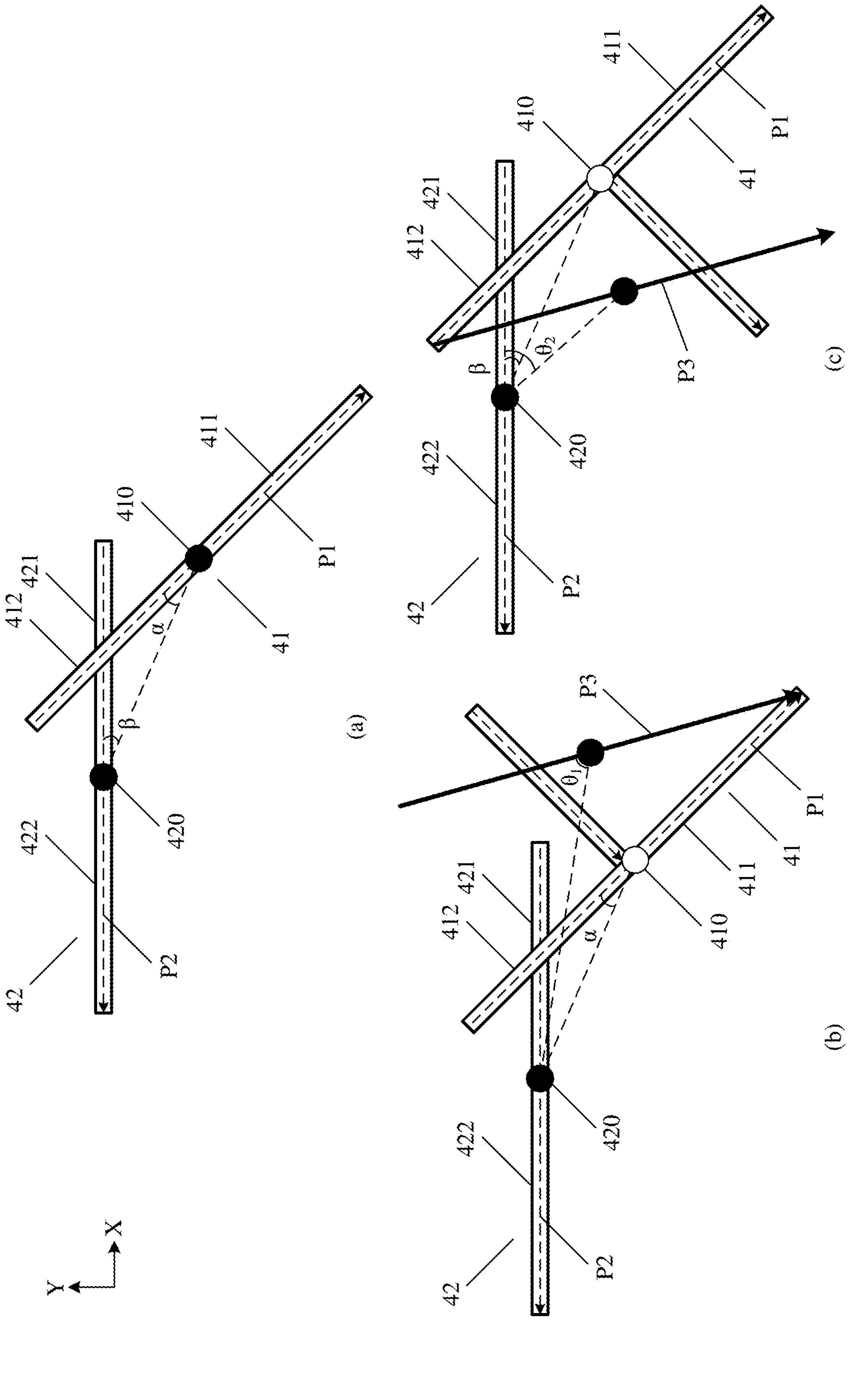
FIG. 13 to FIG. 15 are schematic diagrams of structures of still some other antenna systems according to an embodiment of this application.

FIG. 13 is a schematic diagram of a structure of still another antenna system according to an embodiment of this application, where (a) in FIG. 13 is a schematic diagram of the antenna system on an XOY plane before a tuning stub is loaded, and (b) and (c) in FIG. 13 show two solutions for loading a tuning stub.

The antenna system includes a first antenna 41, a second antenna 42, and a tuning stub 43. The first antenna 41 and the second antenna 42 are a pair of dipole antennas whose operating frequency band is a 2.4 GHz frequency band. The first antenna 41, the second antenna 42, and the tuning stub 43 are all in a straight line shape, and both the first antenna 41 and the second antenna 42 are perpendicular to the XOY plane.

The two antennas in the antenna system are similar to the two antennas in the antenna system in Embodiment 1, and the difference lies in that in this embodiment, the two antennas are not perpendicular to each other. Similar to the antenna in Embodiment 1, the first antenna 41 may include a first radiation arm 411 and a second radiation arm 412 that are connected to each other. A feed point 410 of the first antenna 41 is located between the first radiation arm 411 and the second radiation arm 412. An electrical length of each of the first radiation arm 411 and the second radiation arm 412 may be 0.25λ, and λ is a wavelength corresponding to a center operating frequency (2.45 GHZ) of the 2.4 GHz frequency band. A current of the first antenna 41 flows from the second radiation arm 412 to the first radiation arm 411.

The second antenna 42 may include a third radiation arm 421 and a fourth radiation arm 422 that are connected to each other, a feed point 420 of the second antenna 42 is located between the third radiation arm 421 and the fourth radiation arm 422, and an electrical length of each of the third radiation arm 421 and the fourth radiation arm 422 is 0.25λ. A current of the second antenna 42 flows from the third radiation arm 421 to the fourth radiation arm 422.

As shown in (a) in FIG. 13, before the tuning stub 43 is loaded, an included angle between a connection line between a projection of a maximum current point (at the feed point) of a current path P1 of the first antenna 41 and a projection of a maximum current point (at the feed point) of a current path P2 of the second antenna 42 on the XOY plane and a projection of the current path P1 of the first antenna 41 on the XOY plane is a, and an included angle between the connection line and a projection of the current path P2 of the second antenna 42 on the XOY plane is B.

An electrical length of the tuning stub 43 may be approximately 0.25λ, and may be specifically greater than 0.25λ and less than 0.35λ. The tuning stub 43 may be connected to a position that is on the first radiation arm 411 or the second radiation arm 412 and that is close to the feed point 410, and may form an included angle with the second antenna 42, to improve tuning effect.

In an optional implementation, as shown in (b) in FIG. 13, the tuning stub 43 may be connected to an end that is on the second radiation arm 412 and that is close to the feed point 410, and is perpendicular to the first antenna 41, that is, the tuning stub 43 may be connected to the feed point 410. A current on the tuning stub 43 flows to the feed point 410, and a current path is perpendicular to P1, so that an included angle between a connection line between a projection of a maximum current point of an equivalent current path P3 of the first antenna 41 and a projection of a maximum current point of an equivalent current path P2 of the second antenna 42 on the XOY plane and a projection of the equivalent current path P3 of the first antenna 41 on the XOY plane is changed to $\theta_1$, where $\theta_1$ is greater than α.

In another optional implementation, as shown in (c) in FIG. 13, the tuning stub 43 may be connected to an end that is on the first radiation arm 411 and that is close to the feed point 410, and is perpendicular to the first antenna 41, that is, the tuning stub 43 may be connected to the feed point 410. A current on the tuning stub 43 flows to a tail end of the stub from the feed point 410, and a current path is perpendicular to P1, so that an included angle between a connection line between a projection of a maximum current point of an equivalent current path P3 of the first antenna 41 and a projection of a maximum current point of an equivalent current path P2 of the second antenna 42 on the XOY plane and a projection of the equivalent current path P2 of the second antenna 42 on the XOY plane is changed to $\theta_2$, where $\theta_2$ is greater than β.

During specific implementation, the tuning stub 43 may be parallel to the XOY plane, to achieve better tuning effect.

As shown in FIG. 13, the tuning stub 43 is loaded, so that an included angle between a connection line between a projection of a maximum equivalent current point of the first antenna 41 and a projection of a maximum equivalent current point of the second antenna 42 on the XOY plane and the projection of the equivalent current path P3 of the first antenna 41 on the XOY plane may be closer to 90 degrees. Alternatively, an included angle between a connection line between a projection of a maximum equivalent current point of the first antenna 41 and a projection of a maximum equivalent current point of the second antenna 42 on the XOY plane and the projection of the equivalent current path P2 of the second antenna 42 on the XOY plane is closer to 90 degrees. Therefore, isolation between the two antennas can be improved.

In the foregoing solution, the tuning stub 43 is parallel to the XOY plane, to save space. It may be understood that, in this embodiment, when available space of the antenna is sufficient, a manner similar to those in the foregoing several embodiments may also be used to load the tuning stub 43 on a plane perpendicular to the second antenna 42, so that an included angle between a connection line between a projection of the maximum equivalent current point of the first antenna 41 and a projection of the maximum equivalent current point of the second antenna 42 on the plane and a projection of the equivalent current path of the first antenna 41 on the plane is closer to 90 degrees.

Embodiment 5

Figure 14:
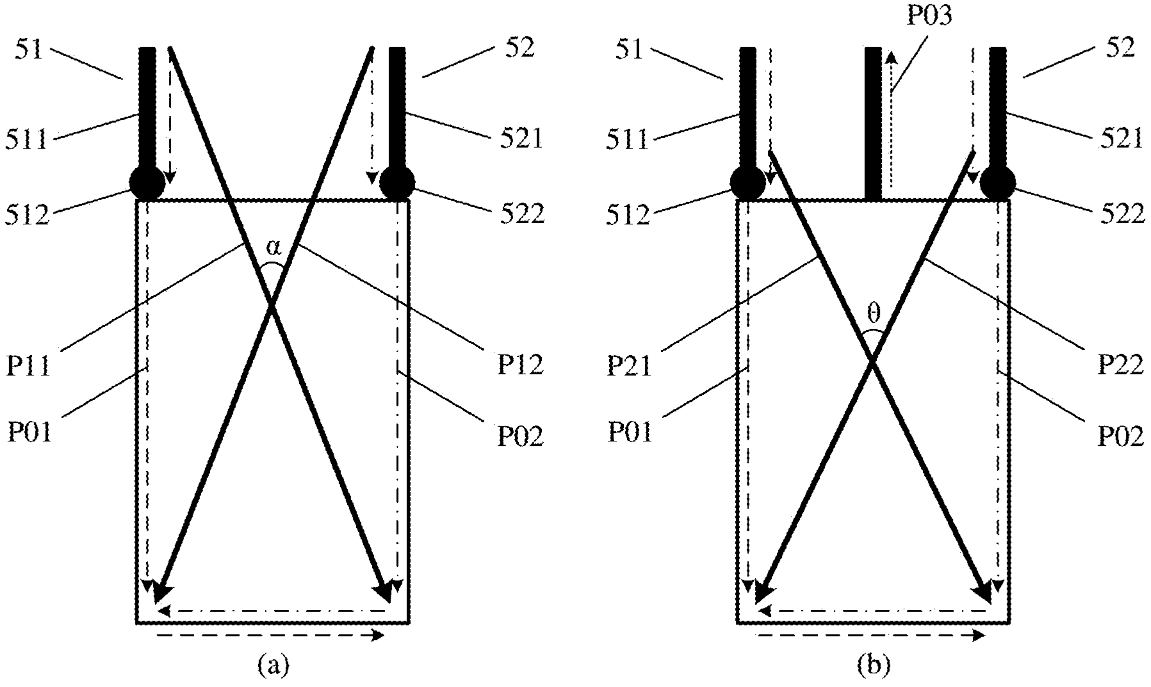

FIG. 14 is a schematic diagram of a structure of still another antenna system according to an embodiment of this application, where (a) in FIG. 14 is a schematic diagram of a structure of the antenna system before a tuning stub is loaded, and (b) in FIG. 14 is a schematic diagram of a structure of the antenna system after a tuning stub is loaded.

The antenna system includes a first antenna 51, a second antenna 52, a tuning stub 53, and a PCB 54. The first antenna 51 and the second antenna 52 are a pair of monopole antennas whose operating frequency band is a 2.4 GHz frequency band. The first antenna 51, the second antenna 52, and the tuning stub 53 are all in a straight line shape, and the first antenna 51 and the second antenna 52 are disposed on a first edge of the PCB 54 at an interval, and are electrically connected to the PCB 54.

The first antenna 51 may include a first radiation arm 511 and a first feed point 512. The first feed point 512 may be located at a connection position of the first radiation arm 511 and the PCB 54, an electrical length of the first radiation arm 511 may be 0.25λ, and λ is a wavelength corresponding to a center operating frequency (2.45 GHz) of the 2.4 GHz frequency band.

The second antenna 52 may include a second radiation arm 521 and a second feed point 522. The second feed point 522 may be located at a connection position of the second radiation arm 521 and the PCB 54, and an electrical length of the second radiation arm 521 may be 0.25λ. Current directions on the first antenna 51 and the second antenna 52 are the same.

The tuning stub 53 may be disposed on the first side edge of the PCB 54, and is electrically connected to the PCB 54. A current on the tuning stub 53 and a current on the first antenna 51 are opposite in direction. An electrical length of the tuning stub 53 may be approximately 0.25λ, and may be specifically greater than 0.25λ and less than 0.35λ. The first side edge may be any side of the PCB 54.

The first antenna 51, the second antenna 52, and the tuning stub 53 may be parallel to a plane in which the PCB 54 is located, or may each have an included angle with a plane in which the PCB 54 is located. In FIG. 14, parallel is used as an example for description.

As shown in (a) in FIG. 14, before the tuning stub 53 is loaded, a current P01 of the first antenna 51 and a current P02 of the second antenna 52 flow from respective radiation arms to the PCB 54, and an included angle between an equivalent current path P11 of the first antenna 51 and an equivalent current path P12 of the second antenna 52 is α. As shown in (b) in FIG. 14, after the tuning stub 53 is loaded, the equivalent current path of the first antenna 51 and the equivalent current path of the second antenna 52 are changed, so that the equivalent current path of the first antenna 51 is changed to P21, and the equivalent current path of the second antenna 52 is changed to P22. The equivalent current path P21 and the equivalent current path P22 form an included angle θ, and the included angle θ is closer to 90 degrees than α. Therefore, isolation between the two antennas can be improved.

It may be understood that, the foregoing solutions for improving antenna isolation by using the tuning stub are merely examples, and are not intended to limit this application. A connection line between projection points of the maximum equivalent current points of the two antennas on a first plane tends to be more perpendicular to a projection of the equivalent current path of the first antenna or the second antenna on the first plane, provided that the equivalent current path of the antenna in the antenna system can be changed. Alternatively, the equivalent current paths of the two antennas tend to be more perpendicular to each other. In this embodiment, a form of the antenna may be a dipole antenna, or may be a monopole antenna, an inverted-F antenna (inverted-F antenna, IFA), a loop (LOOP) antenna, a T-shaped antenna, or another antenna solution. A form of the antenna may alternatively be a slot antenna, a patch (patch) antenna, or an antenna of another type or a hybrid solution. Relative positions of the two antennas may be perpendicular to each other, or may form any included angle. The two antennas may be in a same plane, or may be on any relative position. The loaded tuning stub may be in a straight line shape, a T shape, an L shape, a snake shape, or another shape. A loading position and a cabling direction of the tuning stub may be determined based on available space of the antenna, and the tuning stub may be loaded on either of the two antennas, or may be loaded on both the two antennas. In addition, the tuning stub may be on any radiation arm of the antenna or on a PCB that serves as an arm of the antenna. The tuning stub may be located in the same plane as the two antennas, or may be loaded in another plane, provided that an equivalent path and a direction of a tuning resonant current are reached.

The following describes several feasible solutions for improving antenna isolation by adjusting an antenna direction.

Embodiment 6

Figure 15:
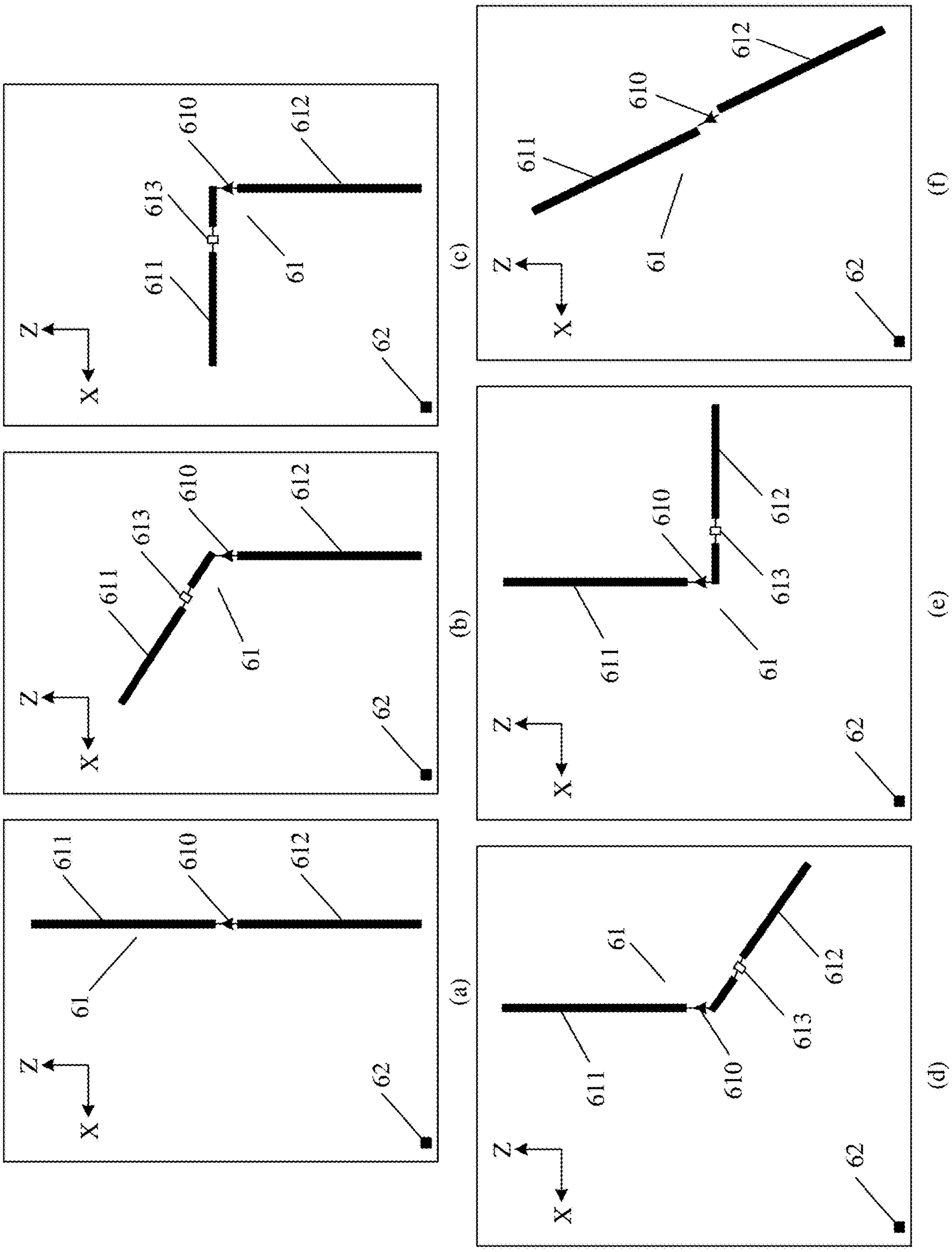

FIG. 15 is a schematic diagram of structures of still some other antenna systems according to an embodiment of this application, where (a) in FIG. 15 is a schematic diagram of an antenna system on an XOZ plane before an antenna direction is adjusted, and (b) to (f) in FIG. 15 show several possible antenna direction adjustment solutions.

As shown in (a) in FIG. 15, the antenna system includes a first antenna 61 and a second antenna 62. The first antenna 61 and the second antenna 62 are perpendicular to each other on different plane. The two antennas are similar to the two antennas in the antenna system in Embodiment 1. The first antenna 61 may include a first radiation arm 611 and a second radiation arm 612 that are connected to each other. A feed point 610 of the first antenna 61 is located between the first radiation arm 611 and the second radiation arm 612. An electrical length of each of the first radiation arm 611 and the second radiation arm 612 may be 0.25λ, where λ is a wavelength corresponding to a center operating frequency (2.45 GHZ) of a 2.4 GHz frequency band. A current of the first antenna 61 flows from the second radiation arm 612 to the first radiation arm 611.

The second antenna 62 may include a third radiation arm and a fourth radiation arm that are connected to each other, a feed point of the second antenna 62 is located between the third radiation arm and the fourth radiation arm, and an electrical length of each of the third radiation arm and the fourth radiation arm is 0.25λ.

As described in Embodiment 1, an included angle between a connection line between a projection point of a maximum current point of a current path of the first antenna 61 and a projection point of a maximum current point of a current path of the second antenna 62 on a first plane and a projection of the current path of the first antenna 61 on the first plane is far less than 90 degrees. In this embodiment, an equivalent current path of the antenna is changed by rotating the antenna radiation arm, to improve isolation between the two antennas.

When the radiation arm of the antenna is rotated, the radiation arm of one of the antennas may be rotated, or the radiation arms of both the two antennas may be rotated. The rotated radiation arm may be parallel to the first plane, or may form an included angle with the first plane. In this embodiment, an example in which the radiation arm of the first antenna 61 is rotated in parallel to the first plane is used for description.

When the radiation arm of the first antenna 61 is rotated, one of the radiation arms may be rotated, or both the two radiation arms may be rotated. When the first radiation arm 611 is rotated, the first radiation arm 611 may be rotated by a specific angle around the feed point towards the second antenna 62. When the second radiation arm 612 is rotated, the second radiation arm 612 may be rotated by a specific angle around the feed point towards a direction away from the second antenna 62. A polarization direction and a length of the rotated radiation arm can be adjusted by loading a tuning element on the radiation arm.

Two solutions for rotating the first radiation arm 612 are shown in (b) and (c) in FIG. 15. The first radiation arm 611 in (b) in FIG. 15 is rotated by 57 degrees, a physical length of the first radiation arm 611 is 27 mm, and the loaded tuning element 613 is a resistor of 0Ω. In (c) in FIG. 15, the first radiation arm 611 is rotated by 90 degrees, a physical length of the first radiation arm 611 is 18 mm, and the loaded tuning element 613 is a 12 nH inductor.

Two solutions for rotating the second radiation arm 612 are shown in (d) and (e) in FIG. 15. The second radiation arm 612 in (d) in FIG. 15 is rotated by 55 degrees, a physical length of the second radiation arm 612 is 27 mm, and the loaded tuning element 613 is a resistor of 0Ω. In (e) in FIG. 15, the second radiation arm 612 is rotated by 90 degrees, a physical length of the second radiation arm 612 is 20 mm, and the loaded tuning element 613 is a 10 nH inductor.

A solution in which both the first radiation arm 611 and the second radiation arm 612 are rotated is shown in (f) in FIG. 15. Both the first radiation arm 611 and the second radiation arm 612 are rotated by 27 degrees, physical lengths of the first radiation arm 611 and the second radiation arm 612 are both 27 mm, and no component is loaded.

Figure 16A:
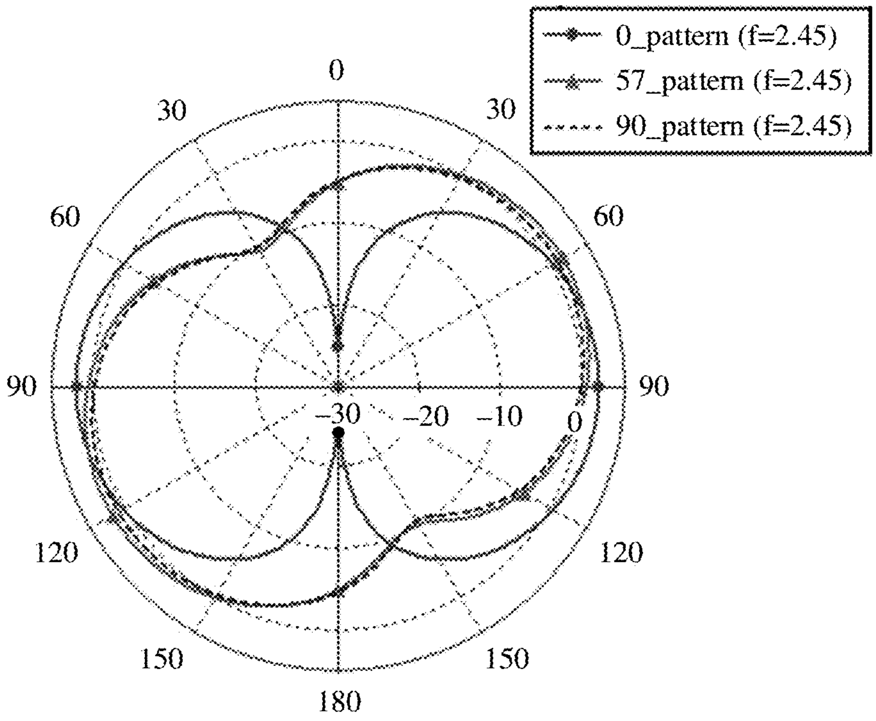
FIG. 16A is a pattern of a first antenna on an XOZ plane before and after a first radiation arm is rotated corresponding to (b) and (c) in FIG. 15.

FIG. 16A is a pattern of the first antenna on an XOZ plane before and after the first radiation arm is rotated corresponding to (b) and (c) in FIG. 15, where "0_pattern (f=2.45)" represents a pattern of the first antenna 61 at 2.45 GHz before the first radiation arm 611 is rotated, "57_pattern (f=2.45)" represents a pattern of the first antenna 61 at 2.45 GHz after the first radiation arm is rotated by 57 degrees in (b) in FIG. 15, and "90_pattern (f=2.45)" represents a pattern of the first antenna 61 at 2.45 GHz after the first radiation arm is rotated by 90 degrees in (c) in FIG. 15.

Figure 16B:
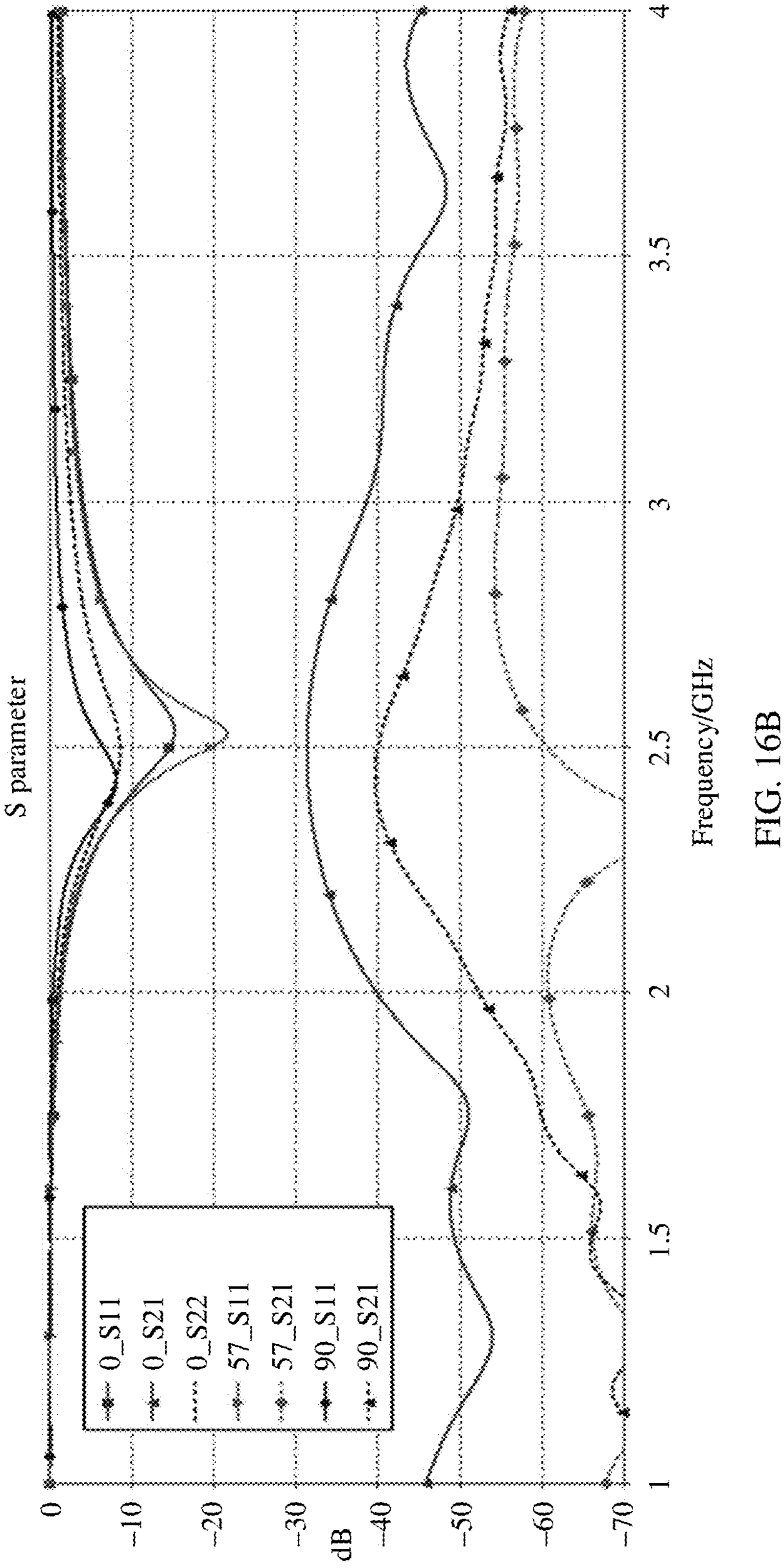
FIG. 16B is a diagram of performance simulation curves of an S parameter of a first antenna before and after a first radiation arm is rotated corresponding to (b) and (c) in FIG. 15.

FIG. 16B is a diagram of performance simulation curves of an S parameter of the first antenna before and after the first radiation arm is rotated corresponding to (b) and (c) in FIG. 15, where "0_S11", "0_S21", and "0_S22" represent performance simulation curves of the S parameter of the antenna system before the first radiation arm 611 is rotated, "57_S11" and "57_S21" represent performance simulation curves of the S parameter of the antenna system after the first radiation arm is rotated by 57 degrees in (b) in FIG. 15, and "90_S11" and "90_S21" represent performance simulation curves of the S parameter of the antenna system after the first radiation arm is rotated by 90 degrees in (c) in FIG. 15.

Figure 16C:
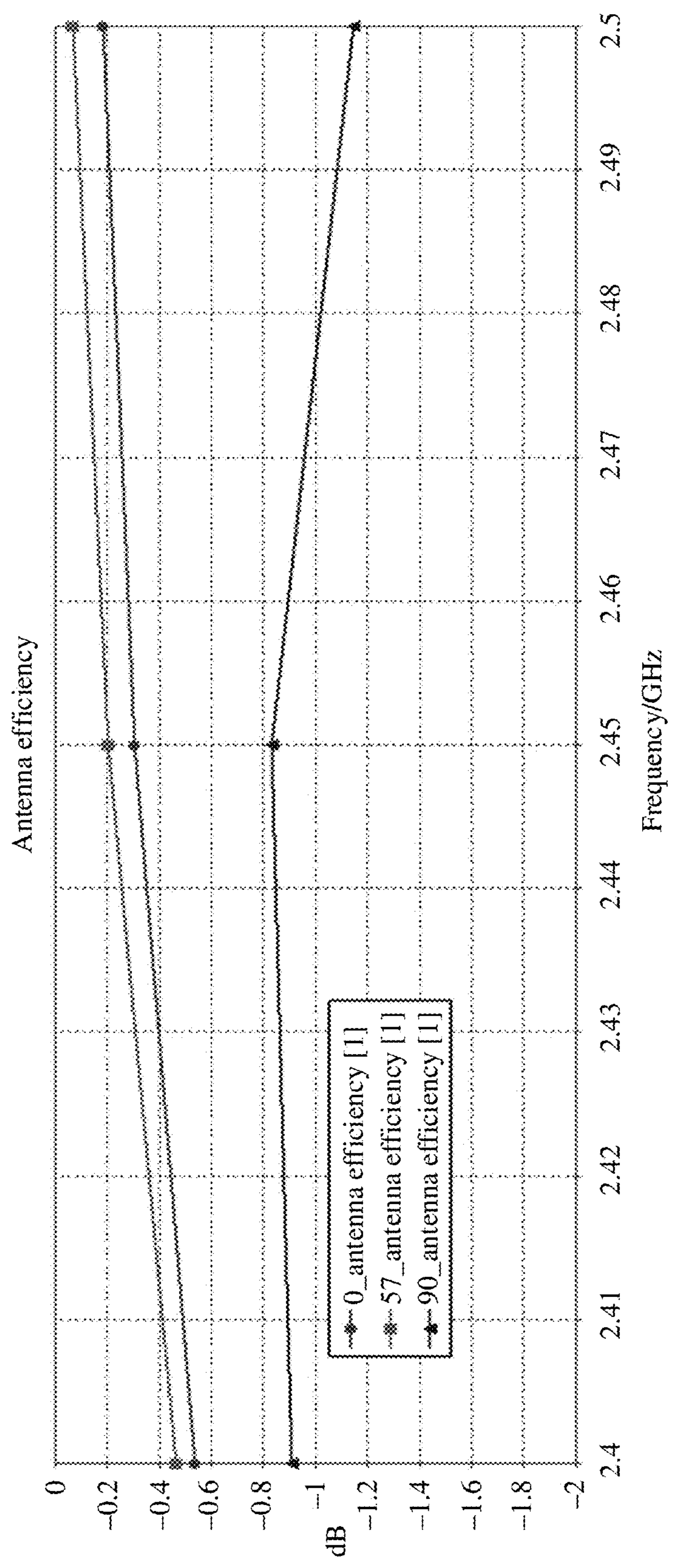
FIG. 16C is a diagram of performance simulation curves of antenna efficiency of a first antenna before and after a first radiation arm is rotated corresponding to (b) and (c) in FIG. 15.

FIG. 16C is a diagram of performance simulation curves of antenna efficiency of the first antenna before and after the first radiation arm is rotated corresponding to (b) and (c) in FIG. 15, where "0_antenna efficiency [1]" represents a performance simulation curve of the antenna efficiency of the first antenna 61 before the first radiation arm 611 is rotated, "57_antenna efficiency [1]" represents a performance simulation curve of the antenna efficiency of the first antenna 61 after the first radiation arm is rotated by 57 degrees in (b) in FIG. 15, and "90_antenna efficiency [1]" represents a performance simulation curve of the antenna efficiency of the first antenna 61 after the first radiation arm is rotated by 90 degrees in (c) in FIG. 15.

As shown in FIG. 16A, after the first radiation arm 611 is rotated by 57 degrees and 90 degrees respectively, a pattern of the first antenna 61 at 2.45 GHz is also rotated anticlockwise by approximately 30 degrees, to achieve tuning effect similar to that in Embodiment 1.

As shown in FIG. 16B, after the first radiation arm 611 is rotated by 57 degrees, isolation between the first antenna 61 and the second antenna 62 is increased by approximately 30 dB, to more than 60 dB. An input return loss S11 of the first antenna 61 is decreased. Correspondingly, refer to FIG. 16C. The antenna efficiency of the first antenna 61 is not reduced, but is improved.

After the first radiation arm 611 is rotated by 90 degrees, isolation between the first antenna 61 and the second antenna 62 is increased by approximately 9 dB, to approximately 40 dB. An input return loss S11 of the first antenna 61 is increased. Correspondingly, refer to FIG. 16C. The antenna efficiency of the first antenna 61 is slightly reduced. Relative to an increase in isolation, the antenna efficiency is slightly changed. In addition, an output return loss S22 of the first antenna 61 remains unchanged.

Figure 17A:
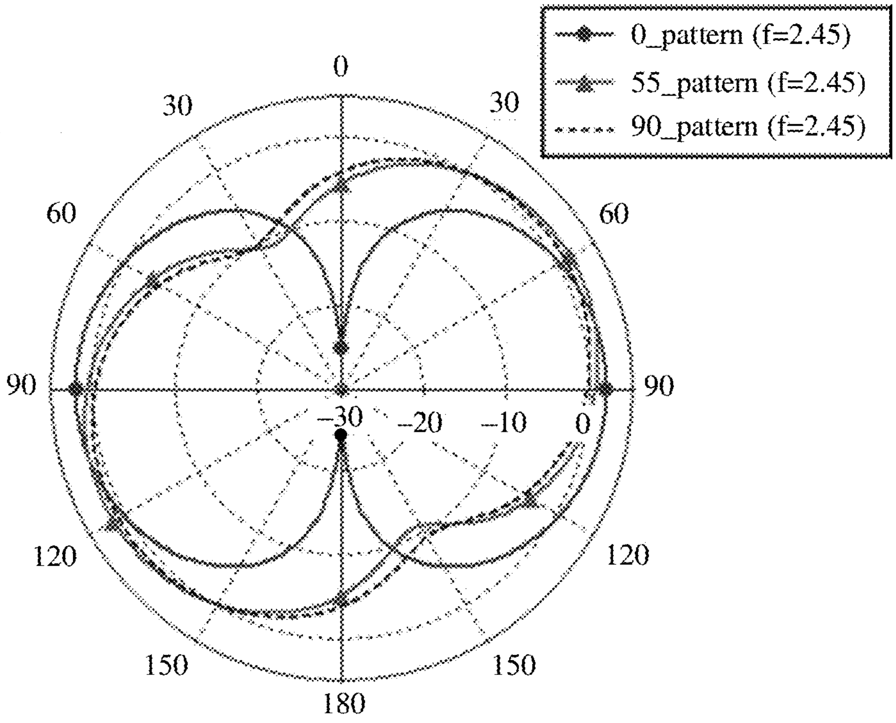
FIG. 17A is a pattern of a first antenna on an XOZ plane before and after a second radiation arm is rotated corresponding to (d) and (e) in FIG. 15.

FIG. 17A is a pattern of the first antenna on an XOZ plane before and after the second radiation arm is rotated corresponding to (d) and (e) in FIG. 15, where "0_pattern (f=2.45)" represents a pattern of the first antenna 61 at 2.45 GHz before the second radiation arm 611 is rotated, "55_pattern (f=2.45)" represents a pattern of the first antenna 61 at 2.45 GHz after the second radiation arm is rotated by 55 degrees in (d) in FIG. 15, and "90_pattern (f=2.45)" represents a pattern of the first antenna 61 at 2.45 GHz after the second radiation arm is rotated by 90 degrees in (e) in FIG. 15.

Figure 17B:
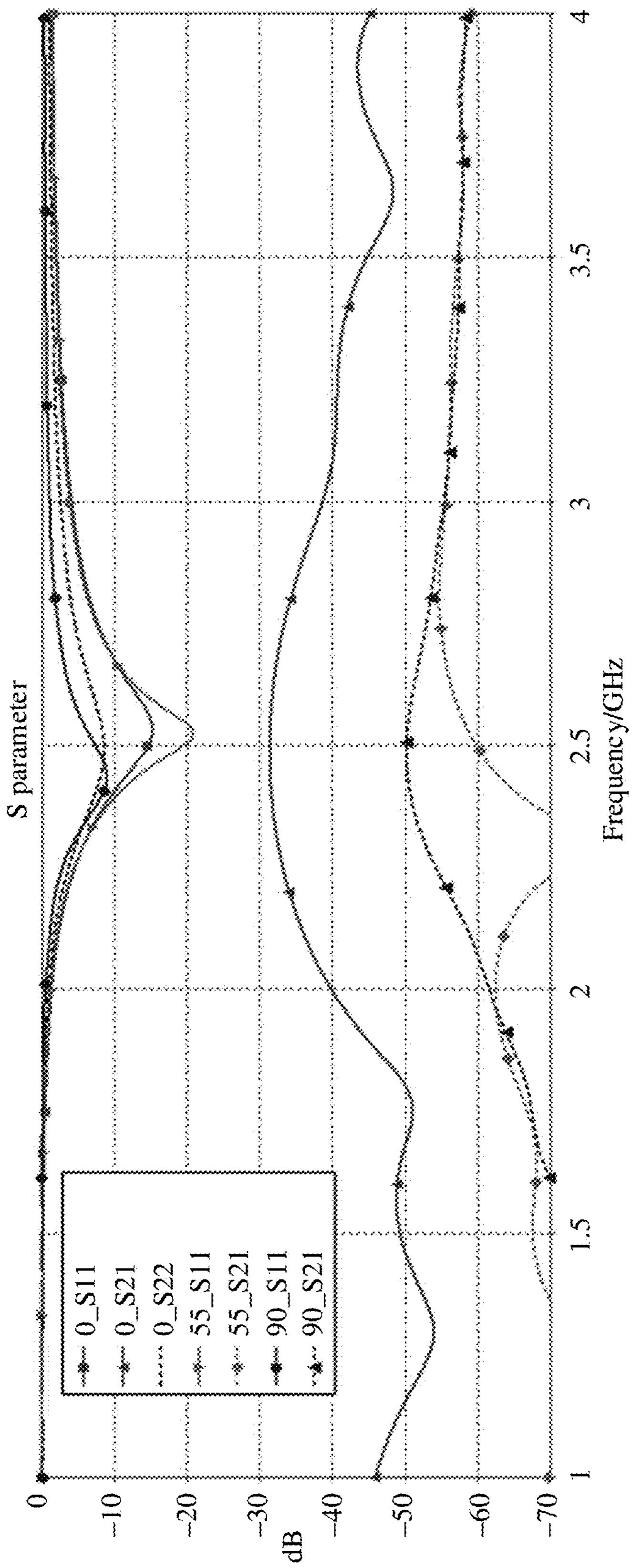
FIG. 17B is a diagram of performance simulation curves of an S parameter of a first antenna before and after a second radiation arm is rotated corresponding to (d) and (e) in FIG. 15.

FIG. 17B is a diagram of performance simulation curves of an S parameter of the first antenna before and after the second radiation arm is rotated corresponding to (d) and (e) in FIG. 15, where "0_S11", "0_S21", and "0_S22" represent performance simulation curves of the S parameter of the antenna system before the second radiation arm 611 is rotated, "55_S11" and "55_S21" represent performance simulation curves of the S parameter of the antenna system after the second radiation arm is rotated by 55 degrees in (d) in FIG. 15, and "90_S11" and "90_S21" represent performance simulation curves of the S parameter of the antenna system after the second radiation arm is rotated by 90 degrees in (e) in FIG. 15.

Figure 17C:
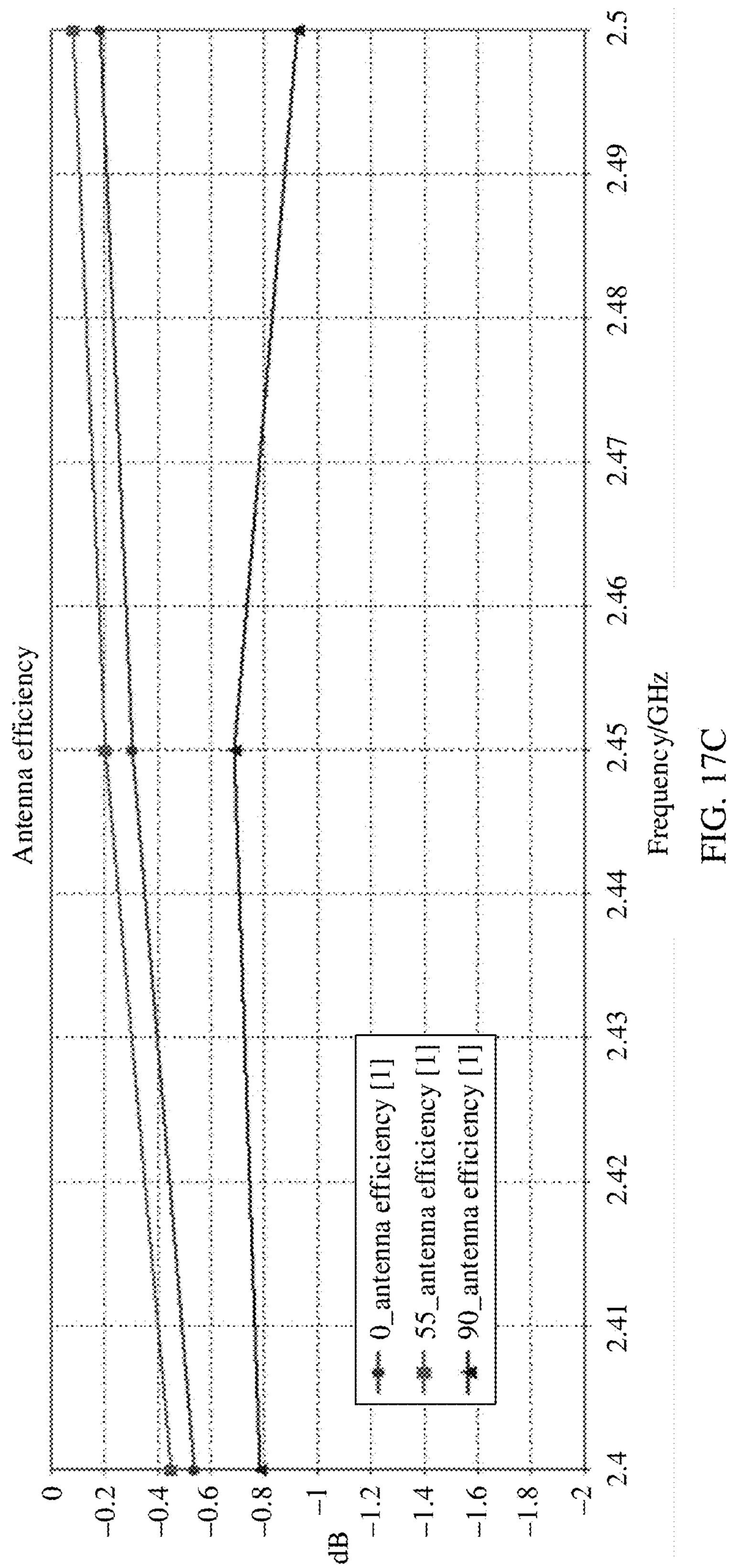
FIG. 17C is a diagram of performance simulation curves of antenna efficiency of a first antenna before and after a second radiation arm is rotated corresponding to (d) and (e) in FIG. 15.

FIG. 17C is a diagram of performance simulation curves of antenna efficiency of the first antenna before and after the second radiation arm is rotated corresponding to (d) and (e) in FIG. 15, where "0_antenna efficiency [1]" represents a performance simulation curve of the antenna efficiency of the first antenna 61 before the second radiation arm 611 is rotated, "55_antenna efficiency [1]" represents a performance simulation curve of the antenna efficiency of the first antenna 61 after the second radiation arm is rotated by 55 degrees in (d) in FIG. 15, and "90_antenna efficiency [1]" represents a performance simulation curve of the antenna efficiency of the first antenna 61 after the second radiation arm is rotated by 90 degrees in (e) in FIG. 15.

As shown in FIG. 17A, after the second radiation arm 612 is rotated by 55 degrees and 90 degrees respectively, a pattern of the first antenna 61 at 2.45 GHz is also rotated anticlockwise by approximately 30 degrees, to achieve tuning effect similar to that in Embodiment 1.

As shown in FIG. 17B, after the second radiation arm 612 is rotated by 55 degrees, isolation between the first antenna 61 and the second antenna 62 is increased by approximately 18 dB, to more than 50 dB. An input return loss S11 of the first antenna 61 is decreased. Correspondingly, refer to FIG. 17C. The antenna efficiency of the first antenna 61 is not reduced, but is improved.

After the second radiation arm 612 is rotated by 90 degrees, isolation between the first antenna 61 and the second antenna 62 is increased by approximately 19 dB, to approximately 50 dB. An input return loss S11 of the first antenna 61 is increased. Correspondingly, refer to FIG. 17C. The antenna efficiency of the first antenna 61 is slightly reduced. Relative to an increase in isolation, the antenna efficiency is slightly changed. In addition, an output return loss S22 of the first antenna 61 remains unchanged.

Figure 18A:
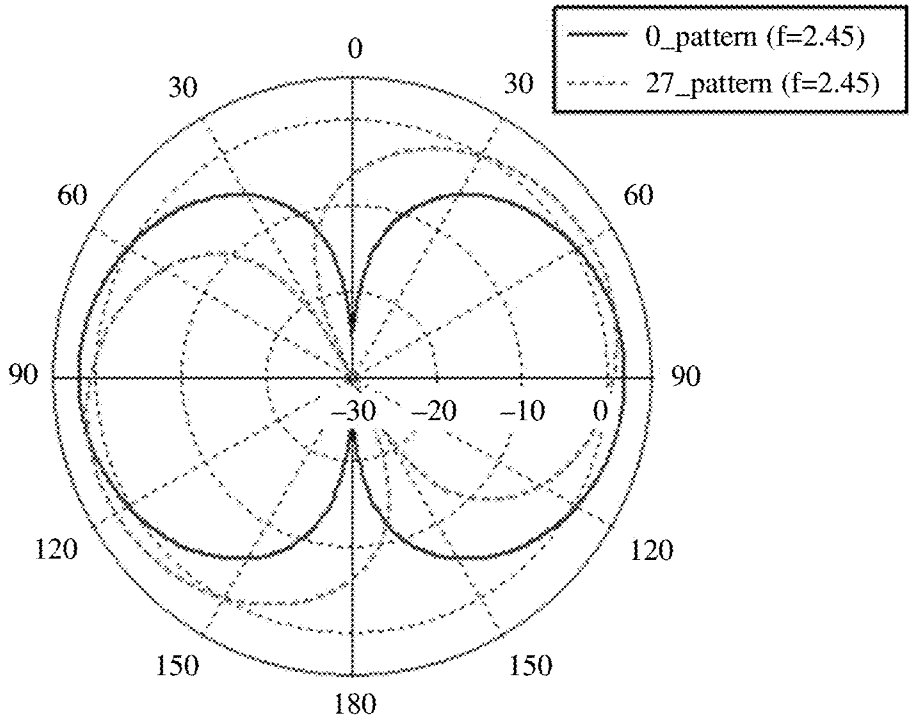
FIG. 18A is a pattern of a first antenna on an XOZ plane before and after a first radiation arm and a second radiation arm are rotated corresponding to (f) in FIG. 15.

FIG. 18A is a pattern of the first antenna on an XOZ plane before and after the first radiation arm and the second radiation arm are rotated corresponding to (f) in FIG. 15, where "0_pattern (f=2.45)" represents a pattern of the first antenna 61 at 2.45 GHz before the first radiation arm and the second radiation arm are rotated, and "27_pattern (f=2.45)" represents a pattern of the first antenna 61 at 2.45 GHz after the first radiation arm and the second radiation arm are rotated by 27 degrees in (f) in FIG. 15.

Figure 18B:
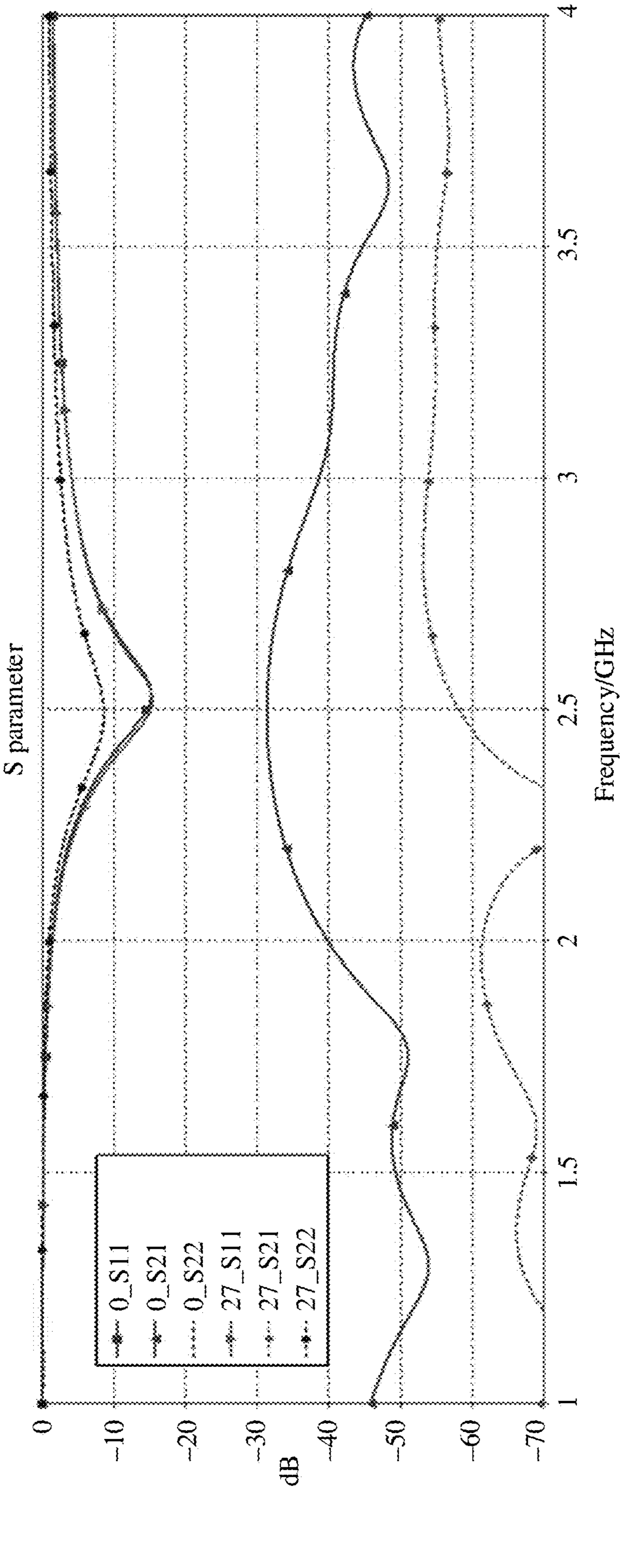
FIG. 18B is a diagram of performance simulation curves of an S parameter of a first antenna before and after a first radiation arm and a second radiation arm are rotated corresponding to (f) in FIG. 15.

FIG. 18B is a diagram of performance simulation curves of an S parameter of the first antenna before and after the first radiation arm and the second radiation arm are rotated corresponding to (f) in FIG. 15, where "0_S11", "0_S21", and "0_S22" represent performance simulation curves of the S parameter of the antenna system before rotation, and "27_S11", "27_S21", and "27_S22" represent performance simulation curves of the S parameter of the antenna system after the first radiation arm and the second radiation arm are rotated by 27 degrees.

Figure 18C:
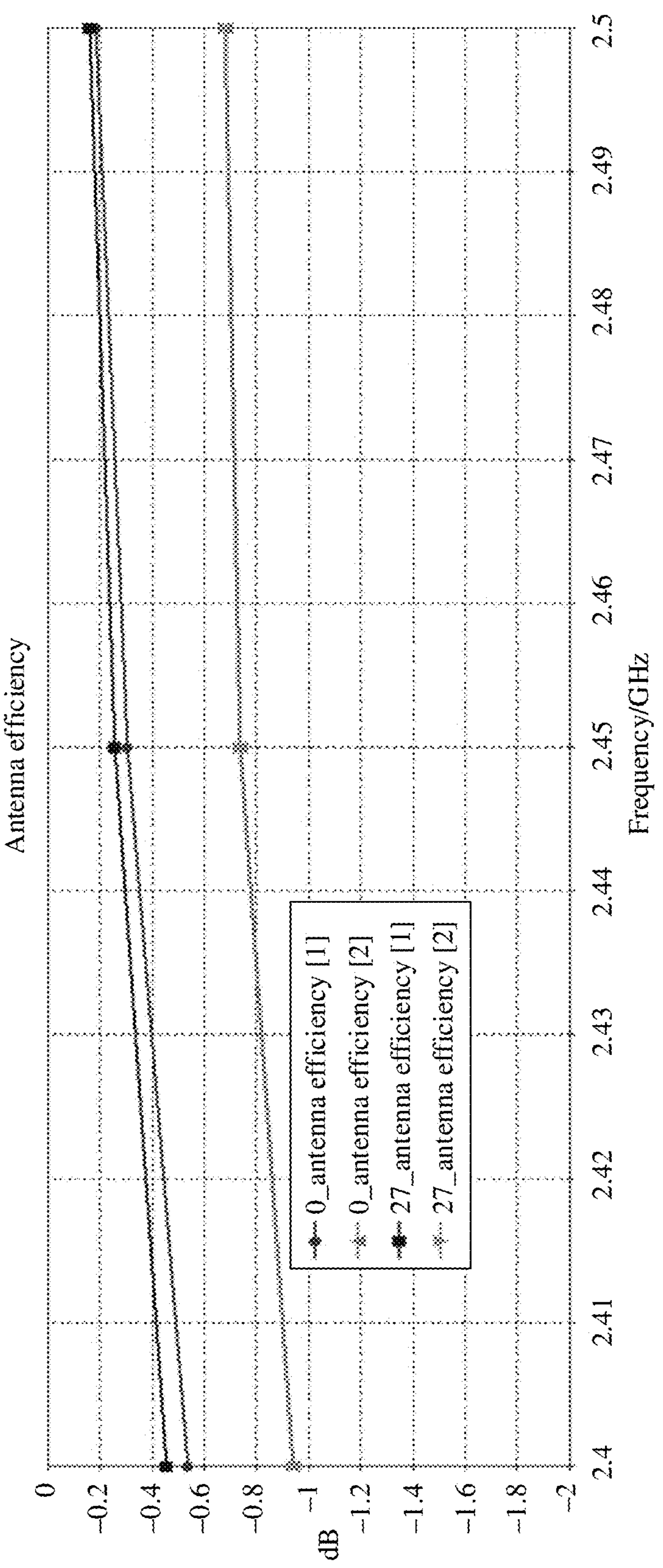
FIG. 18C is a diagram of performance simulation curves of antenna efficiency of an antenna system before and after a first radiation arm and a second radiation arm are rotated corresponding to (f) in FIG. 15.

FIG. 18C is a diagram of performance simulation curves of antenna efficiency of the antenna system before and after the first radiation arm and the second radiation arm are rotated corresponding to (f) in FIG. 15, where "0_antenna efficiency [1]" represents a performance simulation curve of the antenna efficiency of the first antenna 61 before rotation, "0_antenna efficiency [2]" represents a performance simulation curve of the antenna efficiency of the second antenna 62 before rotation, "27_antenna efficiency [1]" represents a performance simulation curve of the antenna efficiency of the first antenna 61 after rotation by 27 degrees, and "27_antenna efficiency [2]" represents a performance simulation curve of the antenna efficiency of the second antenna 62 after rotation by 27 degrees.

As shown in FIG. 18A, after both the first radiation arm 611 and the second radiation arm 612 are rotated by 27 degrees, a pattern of the first antenna 61 at 2.45 GHz is also rotated anticlockwise by approximately 30 degrees, to achieve tuning effect similar to that in Embodiment 1.

As shown in FIG. 18B, after the first radiation arm 611 and the second radiation arm 612 are rotated by 27 degrees, isolation between the first antenna 61 and the second antenna 62 is increased by approximately 25 dB, to approximately 58 dB. An output return loss S22 of the first antenna 61 remains unchanged, and an input return loss S11 of the first antenna 61 is slightly changed. Correspondingly, refer to FIG. 18C. The antenna efficiency of the first antenna 61 is slightly improved, and the antenna efficiency of the second antenna 62 remains unchanged.

Embodiment 7

Figure 19:
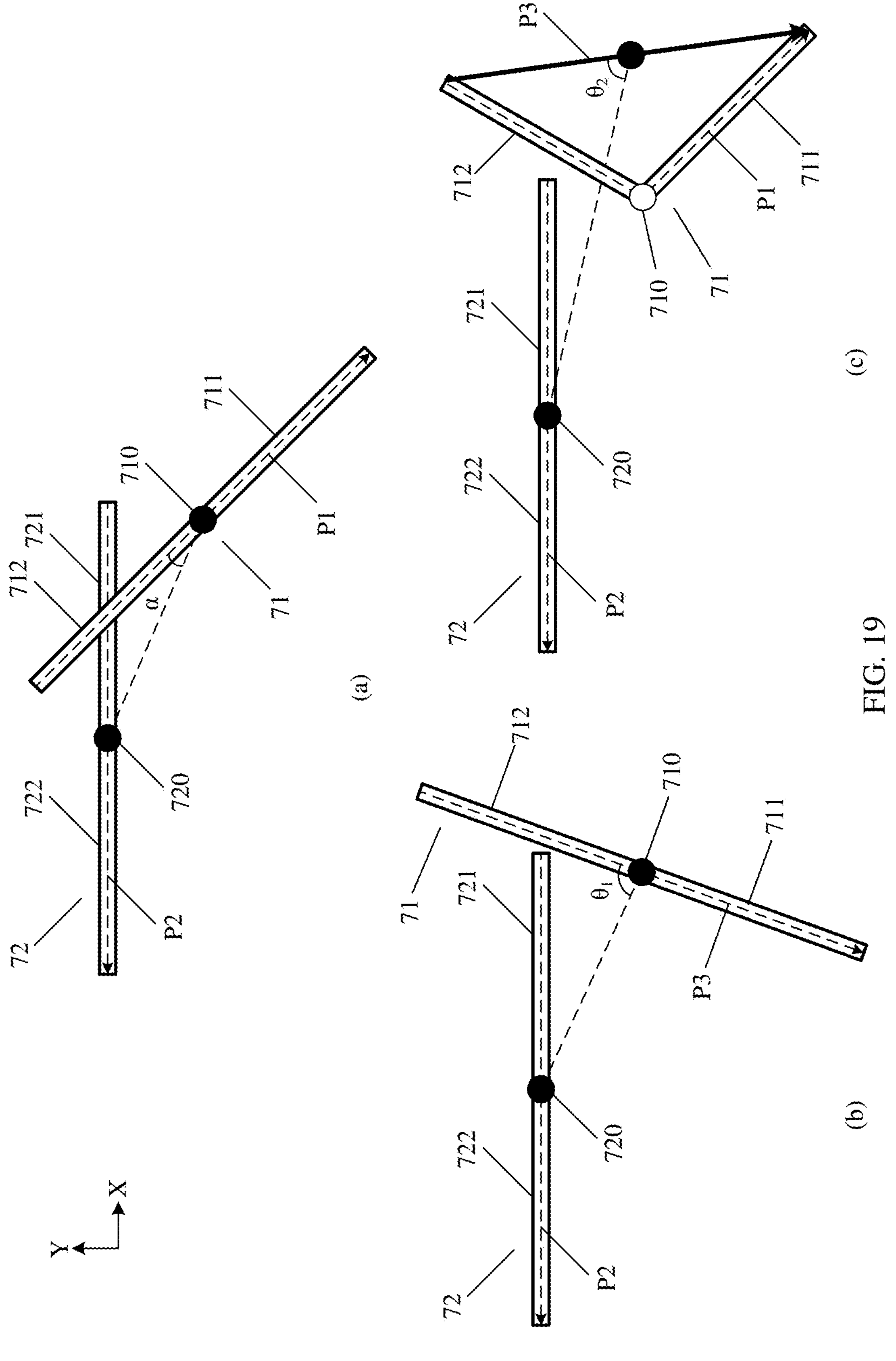
FIG. 19 and FIG. 20 are schematic diagrams of structures of still some other antenna systems according to an embodiment of this application.

FIG. 19 is a schematic diagram of structures of still some other antenna systems according to an embodiment of this application, where (a) in FIG. 19 is a schematic diagram of an antenna system on an XOZ plane before an antenna direction is adjusted, and (b) and (c) in FIG. 19 show several possible antenna direction adjustment solutions.

As shown in (a) in FIG. 19, the antenna system includes a first antenna 71 and a second antenna 72. The two antennas are similar to the two antennas in the antenna system in Embodiment 4 shown in FIG. 13. The first antenna 71 and the second antenna 72 are a pair of dipole antennas whose operating frequency band is a 2.4 GHz frequency band. The first antenna 71, the second antenna 72, and a tuning stub are all in a straight line shape. The first antenna 71 and the second antenna 72 are all parallel to an XOY plane.

The first antenna 71 may include a first radiation arm 711 and a second radiation arm 712 that are connected to each other. A feed point 710 of the first antenna 71 is located between the first radiation arm 711 and the second radiation arm 712. An electrical length of each of the first radiation arm 711 and the second radiation arm 712 may be 0.25λ, and λ is a wavelength corresponding to a center operating frequency (2.45 GHZ) of the 2.4 GHz frequency band. A current of the first antenna 71 flows from the second radiation arm 712 to the first radiation arm 711.

The second antenna 72 may include a third radiation arm 721 and a fourth radiation arm 722 that are connected to each other, a feed point 720 of the second antenna 72 is located between the third radiation arm 721 and the fourth radiation arm 722, and an electrical length of each of the third radiation arm 721 and the fourth radiation arm 722 is 0.25λ. A current of the second antenna 72 flows from the third radiation arm 721 to the fourth radiation arm 722.

As shown in (a) in FIG. 19, before the antenna is rotated, an included angle between a connection line between a projection of a maximum current point on a current path P1 of the first antenna 71 and a projection of a maximum current point on a current path P2 of the second antenna 72 on the XOY plane and a projection of the current path 71 of the first antenna 71 on the XOY plane is α.

Similar to Embodiment 6, when the radiation arm of the antenna is rotated, the radiation arm of one of the antennas may be rotated, or the radiation arms of both the two antennas may be rotated. The rotated radiation arm may be parallel to the XOY plane, or may form an included angle with the XOY plane. In this embodiment, an example in which the radiation arm of the first antenna 71 is rotated in parallel to the XOY plane is used for description. When the radiation arm of the first antenna 71 is rotated, one of the radiation arms may be rotated, or both the two radiation arms may be rotated.

A solution in which both the first radiation arm 711 and the second radiation arm 712 are rotated is shown in (b) in FIG. 19. As shown in (b) in FIG. 19, after the first radiation arm 711 and the second radiation arm 712 are rotated clockwise by a specific angle on the XOY plane, an included angle between a connection line between a projection of a maximum equivalent current point of the first antenna 71 and a projection of a maximum equivalent current point of the second antenna 72 on the XOY plane and a projection of an equivalent current path P3 of the first antenna 71 on the XOY plane is increased to $\theta_1$, where $\theta_1$ is closer to 90 degrees than α. Therefore, isolation between the two antennas can be improved.

A solution in which the second radiation arm 712 is rotated is shown in (c) in FIG. 19. As shown in (b) in FIG. 19, after the second radiation arm 712 is rotated clockwise by a specific angle on the XOY plane, an included angle between a connection line between a projection of a maximum equivalent current point of the first antenna 71 and a projection of a maximum equivalent current point of the second antenna 72 on the XOY plane and a projection of an equivalent current path P3 of the first antenna 71 on the XOY plane is increased to $\theta_2$, where $\theta_2$ is closer to 90 degrees than a. Therefore, isolation between the two antennas can be improved.

In this embodiment, the first antenna 71 may also be rotated, so that an equivalent current path of the first antenna 71 is perpendicular to or more perpendicular to an equivalent current path of the second antenna 72, to improve isolation between the two antennas.

Embodiment 8

Figure 20:
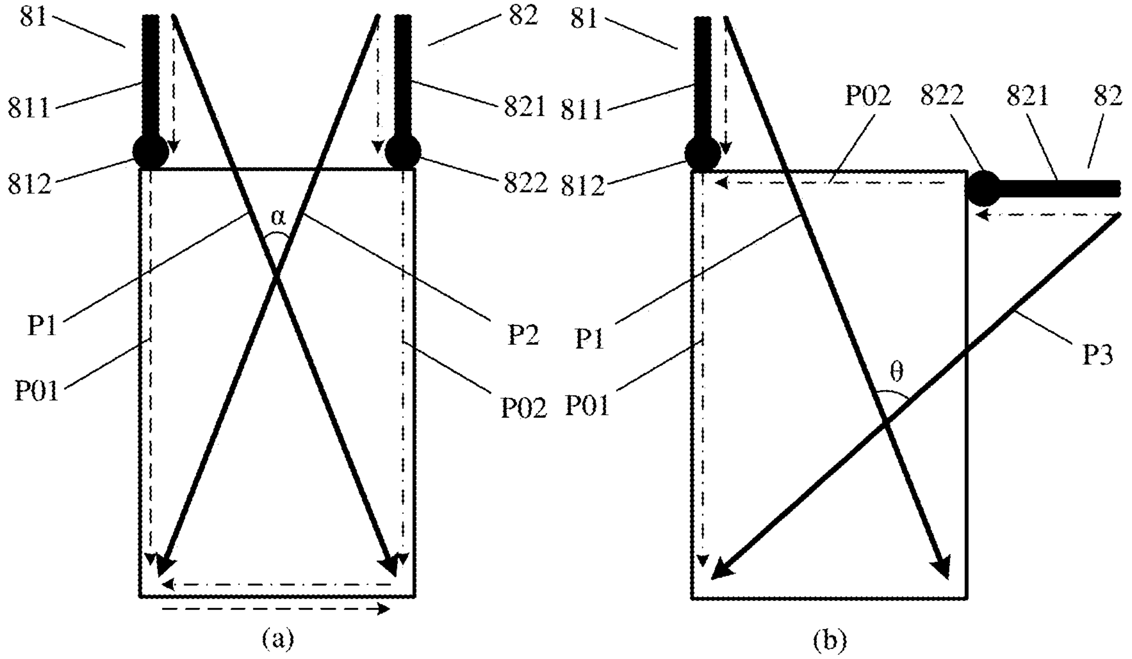

FIG. 20 is a schematic diagram of a structure of yet another antenna system according to an embodiment of this application, where (a) in FIG. 20 is a schematic diagram of a structure of the antenna system before an antenna direction is adjusted, and (b) in FIG. 20 is a schematic diagram of a structure of the antenna system after the antenna direction is adjusted.

The antenna system includes a first antenna 81, a second antenna 82, and a PCB 83. The antenna system is similar to the two antennas and the PCB 83 of the antenna system in Embodiment 4 shown in FIG. 14. The first antenna 81 and the second antenna 82 are a pair of monopole antennas whose operating frequency band is a 2.4 GHz frequency band. Both the first antenna 81 and the second antenna 82 are in a straight line shape. The first antenna 81 and the second antenna 82 are disposed on a first side edge of the PCB 83 at an interval, and are electrically connected to the PCB 83.

The first antenna 81 may include a first radiation arm 811 and a first feed point 812. The first feed point 812 may be located at a connection position of the first radiation arm 811 and the PCB 83, an electrical length of the first radiation arm 811 may be 0.25λ, and λ is a wavelength corresponding to a center operating frequency (2.45 GHZ) of the 2.4 GHz frequency band.

The second antenna 82 may include a second radiation arm 821 and a second feed point 822. The second feed point 822 may be located at a connection position of the second radiation arm 821 and the PCB 83, and an electrical length of the second radiation arm 821 may be 0.25λ. Current directions on the first antenna 81 and the second antenna 82 are the same.

As shown in (a) in FIG. 20, before the antenna is loaded, a current P01 of the first antenna 81 and a current P02 of the second antenna 82 flow from respective radiation arms to the PCB 83, and an included angle between an equivalent current path P1 of the first antenna 81 and an equivalent current path P2 of the second antenna 82 is α.

Similar to Embodiment 6, when the antenna is rotated, one of the antennas may be rotated, or both the two antennas may be rotated. The rotated antenna may be parallel to a plane on which the PCB 83 is located, or may form an included angle with a plane on which the PCB 83 is located. In this embodiment, an example in which the second antenna 82 is rotated in parallel to the plane on which the PCB 83 is located is used for description.

A solution in which the second antenna 82 is rotated is shown in (b) in FIG. 20. As shown in (b) in FIG. 20, after the second antenna 82 is rotated clockwise by 90 degrees on an XOY plane, an equivalent current path of the second antenna 82 is changed to P3, and an equivalent current path of the first antenna 81 and the equivalent current path of the second antenna 82 form an included angle θ. The included angle θ is closer to 90 degrees than α. Therefore, isolation between the two antennas can be improved.

It may be understood that, in the foregoing various solutions for improving antenna isolation by adjusting an antenna direction, an angle of adjusting an antenna may be any angle, one of the antennas may be adjusted, or both the two antennas may be adjusted, or one arm of the antenna may be adjusted, or both the two arms may be adjusted. Angles adjusted by the two arms may be the same or different. A physical length of the antenna may also be any length, and an electrical length of the antenna may reach approximately 0.25λ by loading a tuning element.

In addition, a specific parameter value (for example, an electrical length, a size, or a frequency) of each antenna component described in the foregoing embodiments is an example. Each parameter value may be an approximate value, that is, an error may be allowed, or may be adjusted based on an actual situation. This is not particularly limited in this embodiment.

In addition, the antenna system may also include more than three antennas, and isolation between any two antennas may be implemented by adding a tuning stub or adjusting an antenna direction.

According to the antenna system provided in embodiments of this application, an equivalent current path of at least one of two antennas is adjusted by loading a tuning stub in an antenna system, or an equivalent current path of an antenna is rotated by rotating a radiation arm of the antenna, so that a connection line between projection points of maximum current points of the equivalent current paths of the two antennas on a target plane may trend to be more perpendicular to a projection of an adjusted equivalent current path of the antenna on the target plane, or the equivalent current paths of the two antennas tend to be more perpendicular to each other. When the equivalent current paths of the two antennas are perpendicular to each other, polarization directions of the two antennas are perpendicular to each other, and the two antennas receive fewer incoming wave components (namely, interference waves) from each other. Therefore, isolation between the two antennas can be improved. When a connection line between maximum equivalent current points of the two antennas is perpendicular to the equivalent current path of a target antenna of the two antennas, incoming wave components that are of the other antenna and that are received by radiation arms on two sides of a feed point of the target antenna are equal in amplitude and opposite in phase, and the two incoming wave components can cancel each other when reaching the feed point of the target antenna. In this way, isolation between the two antennas can be effectively improved.

Figure 21:
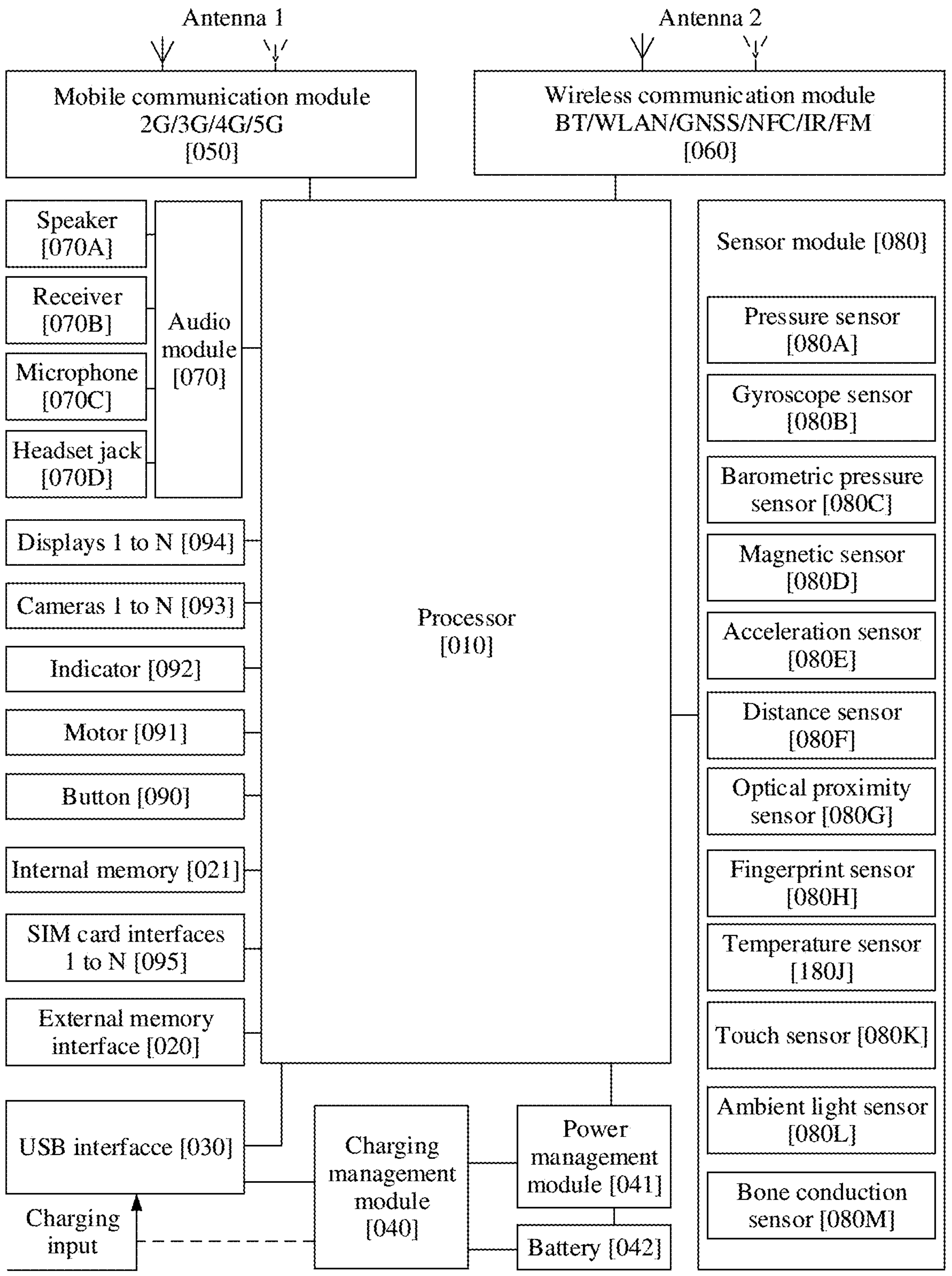
FIG. 21 is a schematic diagram of a structure of an electronic device according to an embodiment of this application.

Based on a same concept, an embodiment of this application further provides an electronic device. FIG. 21 is a schematic diagram of a structure of an electronic device according to an embodiment of this application.

The electronic device may include a processor 010, an external memory interface 020, an internal memory 021, a universal serial bus (universal serial bus, USB) interface 030, a charging management module 040, a power management module 041, a battery 042, an antenna 1, an antenna 2, a mobile communication module 050, a wireless communication module 060, an audio module 070, a speaker 070A, a receiver 070B, a microphone 070C, a headset jack 070D, a sensor module 080, a button 090, a motor 091, an indicator 092, a camera 093, a display 094, a subscriber identification module (subscriber identification module, SIM) card interface 095, and the like. The sensor module 080 may include a pressure sensor 080A, a gyroscope sensor 080B, a barometric pressure sensor 080C, a magnetic sensor 080D, an acceleration sensor 080E, a distance sensor 080F, an optical proximity sensor 080G, a fingerprint sensor 080H, a temperature sensor 080J, a touch sensor 080K, an ambient light sensor 080L, a bone conduction sensor 080M, and the like.

It may be understood that the structure shown in this embodiment of this application does not constitute a specific limitation on the electronic device. In some other embodiments of this application, the electronic device may include more or fewer components than those shown in the figure, or some components may be combined, or some components may be split, or different component arrangements may be used. The components shown in the figure may be implemented by hardware, software, or a combination of software and hardware.

The processor 010 may include one or more processing units. For example, the processor 010 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device. The controller may generate an operation control signal based on an instruction operation code and a time sequence signal, to complete control of instruction reading and instruction execution.

A memory may be further disposed in the processor 010, and is configured to store instructions and data. In some embodiments, the memory in the processor 010 is a cache. The memory may store instructions or data that has been used or cyclically used by the processor 010. If the processor 010 needs to use the instructions or the data again, the processor 010 may directly invoke the instructions or the data from the memory. This avoids repeated access and reduces waiting time of the processor 010, thereby improving system efficiency.

In some embodiments, the processor 010 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, including a serial data line (serial data line, SDA) and a serial clock line (serial clock line, SCL). The I2S interface may be configured to perform audio communication. The PCM interface may also be used to perform audio communication, and sample, quantize, and code an analog signal. The UART interface is a universal serial data bus, and is configured to perform asynchronous communication. The bus may be a two-way communication bus. The UART interface converts to-be-transmitted data between serial communication and parallel communication. The MIPI interface may be configured to connect the processor 010 to peripheral components such as a display 094 and a camera 093. The MIPI interface includes a camera serial interface (camera serial interface, CSI), a display serial interface (display serial interface, DSI), and the like. The GPIO interface may be configured by using software. The GPIO interface may be configured as a control signal or a data signal. The USB interface 030 is an interface that conforms to a USB standard specification, and may be specifically a mini USB interface, a micro USB interface, a USB type-C interface, or the like. The USB interface 030 may be configured to connect to a charger to charge the electronic device, or may be configured to transmit data between the electronic device and a peripheral device, or may be configured to connect to a headset for playing an audio through the headset. The interface may be further configured to connect to another electronic device like an AR device.

It may be understood that, an interface connection relationship between the modules shown in this embodiment of this application is merely an example for description, and does not constitute a limitation on the structure of the electronic device. In some other embodiments of this application, the electronic device may alternatively use an interface connection manner different from that in the foregoing embodiment, or use a combination of a plurality of interface connection manners.

The charging management module 040 is configured to receive a charging input from a charger. The charger may be a wireless charger or a wired charger. In some embodiments of wired charging, the charging management module 040 may receive a charging input of a wired charger through the USB interface 030. In some embodiments of wireless charging, the charging management module 040 may receive a wireless charging input through a wireless charging coil of the electronic device. When charging the battery 042, the charging management module 040 may further charge the electronic device by using the power management module 041.

The power management module 041 is configured to connect to the battery 042, the charging management module 040, and the processor 010. The power management module 041 receives an input of the battery 042 and/or the charging management module 040, to supply power to the processor 010, the internal memory 021, an external memory, the display 094, the camera 093, the wireless communication module 060, and the like. The power management module 041 may be further configured to monitor parameters such as a battery capacity, a battery cycle count, and a battery health status (an electric leakage or impedance). In some other embodiments, the power management module 041 may alternatively be disposed in the processor 010. In some other embodiments, the power management module 041 and the charging management module 040 may alternatively be disposed in a same component.

A wireless communication function of the electronic device may be implemented through the antenna 1, the antenna 2, the mobile communication module 050, the wireless communication module 060, the modem processor, the baseband processor, and the like. The antenna 2 may include the antenna system in any one of the foregoing embodiments.

The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 050 may provide a wireless communication solution that is applied to the electronic device and that includes 2G/3G/4G/5G. The mobile communication module 050 may include at least one filter, a switch, a power amplifier, a low noise amplifier (low noise amplifier, LNA), and the like. The mobile communication module 050 may receive an electromagnetic wave through the antenna 1, perform processing such as filtering or amplification on the received electromagnetic wave, and transmit the electromagnetic wave to the modem processor for demodulation. The mobile communication module 050 may further amplify a signal modulated by the modem processor, and convert the signal into an electromagnetic wave for radiation through the antenna 1. In some embodiments, at least some functional modules in the mobile communication module 050 may be disposed in the processor 010. In some embodiments, at least some functional modules of the mobile communication module 050 may be disposed in a same component as at least some modules in the processor 010.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 070A, the receiver 070B, or the like), or displays an image or a video by using the display 094. In some embodiments, the modem processor may be an independent component. In some other embodiments, the modem processor may be independent of the processor 010, and is disposed in a same component as the mobile communication module 050 or another function module.

The wireless communication module 060 may provide a solution, applied to the electronic device, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 060 may be one or more components integrating at least one communication processor module. The wireless communication module 060 receives an electromagnetic wave through the antenna 2, performs frequency modulation and filtering processing on an electromagnetic wave signal, and sends a processed signal to the processor 010. The wireless communication module 060 may further receive a to-be-sent signal from the processor 010, perform frequency modulation and amplification on the signal, and convert the signal into an electromagnetic wave for radiation through the antenna 2.

In some embodiments, the antenna 1 and the mobile communication module 050 in the electronic device are coupled, and the antenna 2 and the wireless communication module 060 in the electronic device are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time division-synchronous code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GNSS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device may implement a display function through the GPU, the display 094, the application processor, and the like. The GPU is a microprocessor for image processing, and is connected to the display 094 and the application processor. The GPU is configured to: perform mathematical and geometric computation, and render an image. The processor 010 may include one or more GPUs that execute program instructions to generate or change display information.

The display 094 is configured to display an image, a video, and the like. The display 094 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the electronic device may include one or N displays 094, where N is a positive integer greater than 1.

The electronic device may implement a photographing function by using the ISP, the camera 093, the video codec, the GPU, the display 094, the application processor, and the like.

The ISP is configured to process data fed back by the camera 093. The camera 093 is configured to capture a static image or a video. The digital signal processor is configured to process a digital signal, and may process another digital signal in addition to the digital image signal. The video codec is configured to compress or decompress a digital video.

The NPU is a neural-network (neural-network, NN) computing processor. The NPU quickly processes input information based on a structure of a biological neural network, for example, based on a transfer mode between human brain neurons, and may further continuously perform self-learning. Applications such as intelligent cognition of the electronic device may be implemented through the NPU, for example, image recognition, facial recognition, speech recognition, and text understanding.

The internal memory 021 may be configured to store computer-executable program code, and the executable program code includes instructions. The processor 010 runs the instructions stored in the internal memory 021, to implement various function applications and data processing of the electronic device. The internal memory 021 may include a program storage area and a data storage area. The program storage area may store an operating system, an application required by at least one function (for example, a voice playing function or an image playing function), and the like. The data storage area may store data (such as audio data and a phone book) created when the electronic device is used, and the like. In addition, the internal memory 021 may include a high-speed random access memory, or may include a nonvolatile memory like at least one disk storage device, a flash memory, or a universal flash storage (universal flash storage, UFS).

The external memory interface 020 may be used to connect to an external memory, for example, a micro SD card, to extend a storage capability of the electronic device. The external memory card communicates with the processor 010 through the external memory interface 020, to implement a data storage function. For example, files such as music and videos are stored in the external storage card.

The electronic device may implement an audio function like music playback or recording through the audio module 070, the speaker 070A, the receiver 070B, the microphone 070C, the headset jack 070D, the application processor, and the like.

The audio module 070 is configured to convert digital audio information into an analog audio signal for output, and is also configured to convert an analog audio input into a digital audio signal. The audio module 070 may be further configured to code and decode an audio signal. In some embodiments, the audio module 070 may be disposed in the processor 010, or some function modules of the audio module 070 are disposed in the processor 010. The speaker 070A, also referred to as a "loudspeaker", is configured to convert an audio electrical signal into a sound signal. The receiver 070B, also referred to as an "earpiece", is configured to convert an audio electrical signal into a sound signal. The microphone 070C, also referred to as a "mike" or a "mic", is configured to convert a sound signal into an electrical signal. The headset jack 070D is configured to connect to a wired headset. The headset jack 070D may be the USB interface 030, or may be a 3.5 mm open mobile terminal platform (open mobile terminal platform, OMTP) standard interface or cellular telecommunications industry association of the USA (cellular telecommunications industry association of the USA, CTIA) standard interface.

The button 090 includes a power button, a volume button, and the like. The button 090 may be a mechanical button, or may be a touch button. The electronic device may receive a button input, and generate a button signal input related to user settings and function control of the electronic device. The motor 091 may generate a vibration prompt. The motor 091 may be configured to provide an incoming call vibration prompt and a touch vibration feedback. The indicator 092 may be an indicator light, and may be configured to indicate a charging status and a power change, or may be configured to indicate a message, a missed call, a notification, or the like. The SIM card interface 095 is configured to connect to a SIM card. The SIM card may be inserted into the SIM card interface 095 or removed from the SIM card interface 095, to implement contact with or separation from the electronic device. The electronic device may support one or N SIM card interfaces, where N is a positive integer greater than 1. The SIM card interface 095 may support a nano SIM card, a micro SIM card, a SIM card, and the like.

In the foregoing embodiments, the description of each embodiment has a focus. For a part that is not described in detail or recorded in an embodiment, refer to related descriptions in other embodiments.

In embodiments provided in this application, it should be understood that the disclosed apparatus/device and method may be implemented in other manners. For example, the described apparatus/device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

It should be understood that in the descriptions of the specification and the appended claims of this application, the terms "include", "contain" and any other variants mean to cover a non-exclusive inclusion, for example, a process, method, system, product, or device that includes a series of steps or modules is not necessarily limited to those expressly listed steps or modules, but may include other steps or modules not expressly listed or inherent to such a process, method, product, or device.

Unless otherwise specified, "/" in the descriptions of embodiments of this application represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists. A and B may be singular or plural.

Moreover, in the descriptions of this application, unless otherwise specified, "a plurality of" means two or more than two. "At least one of the following" or a similar expression thereof means any combination of these items, including any combination of a single item or a plurality of items. For example, at least one of a, b, or c may represent a, b, c, a and b, a and c, b and c, or a and b and c. Herein, a, b, and c may be singular or plural.

In addition, in the descriptions of the specification and the appended claims of this application, the terms "first", "second", "third", and the like are intended to distinguish between similar objects but do not necessarily indicate a specific order or sequence. It should be understood that the data termed in such a way are interchangeable in proper circumstances so that embodiments described herein can be implemented in other orders than the order illustrated or described herein.

Reference to "an embodiment", "some embodiments", or the like described in the specification of this application indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. An antenna system, comprising a first antenna, a second antenna, and a tuning stub, wherein the first antenna and the second antenna have a same first operating frequency band; wherein the tuning stub is electrically connected to the first antenna, and the tuning stub is configured to adjust an equivalent current path of the first antenna; wherein a connection line between a projection point of a maximum equivalent current point of the first antenna and a projection point of a maximum equivalent current point of the second antenna on a first plane and a projection of the equivalent current path of the first antenna on the first plane form a first included angle before the first antenna loads the tuning stub, and form a second included angle after the first antenna loads the tuning stub; wherein the connection line between the projection point of the maximum equivalent current point of the first antenna and the projection point of the maximum equivalent current point of the second antenna on the first plane and a projection of an equivalent current path of the second antenna on the first plane form a third included angle before the first antenna loads the tuning stub, and form a fourth included angle after the first antenna loads the tuning stub; and wherein a projection of the equivalent current path of the first antenna and a projection of the equivalent current path of the second antenna on a second plane form a fifth included angle before the first antenna loads the tuning stub, and form a sixth included angle after the first antenna loads the tuning stub, wherein the first included angle to the sixth included angle are all less than or equal to 90 degrees; and wherein the second included angle is greater than the first included angle, or the fourth included angle is greater than the third included angle, or the sixth included angle is greater than the fifth included angle.

2. The antenna system according to claim 1, wherein the first plane is perpendicular to the equivalent current path of the second antenna.

3. The antenna system according to claim 2, wherein the fifth included angle is 90 degrees.

4. The antenna system according to claim 3, wherein the first antenna, the second antenna, and the tuning stub are all in a straight line shape, the first antenna comprises a first radiation arm and a second radiation arm that are interconnected, a feed point of the first antenna is located between the first radiation arm and the second radiation arm, an electrical length of each of the first radiation arm and the second radiation arm is a quarter of a first wavelength, and the first wavelength corresponds to a center operating frequency of the first operating frequency band; and the tuning stub is connected to a position that is on the first radiation arm or the second radiation arm and that is connected to or adjacent to the feed point, and an included angle is formed between the tuning stub and the second antenna.

5. The antenna system according to claim 4, wherein the tuning stub is perpendicular to the first antenna, and the tuning stub is connected to the feed point.

6. The antenna system according to claim 4, wherein a current of the first antenna flows from the second radiation arm to the first radiation arm; and wherein the tuning stub is connected to a side that is of the first radiation arm and that faces the second antenna, or the tuning stub is connected to a side that is of the second radiation arm and that is furthest away from the second antenna.

7. The antenna system according to claim 3, wherein the first antenna and the second antenna have a same second operating frequency band;

wherein the first antenna comprises a first radiation arm, a second radiation arm, a third radiation arm, a fourth radiation arm, and an impedance tuning arm, and wherein a feed point of the first antenna is located between two ends of the impedance tuning arm;

wherein an operating frequency band of each of the first radiation arm and the second radiation arm is the first operating frequency band, and the first radiation arm and the second radiation arm are connected to the two ends of the impedance tuning arm;

wherein an operating frequency band of each of the third radiation arm and the fourth radiation arm is the second operating frequency band, and the third radiation arm and the fourth radiation arm are connected to the two ends of the impedance tuning arm; and wherein each radiation arm of the first antenna is located on one side of the feed point, and the tuning stub is located on the other side of the feed point.

8. The antenna system according to claim 7, wherein the tuning stub comprises a first stub and a second stub that are perpendicular to each other, one end of the second stub is connected to a middle part of the first stub, and the other end of the second stub is connected to the feed point; and wherein a first tuning element and a second tuning element are disposed on the second stub at an interval, the first tuning element is located between the second tuning element and the feed point, a sum of an electrical length of a stub between the first tuning element and the second tuning element and an electrical length of the first tuning element is greater than a quarter of a second wavelength, the second wavelength is less than a first wavelength, the first wavelength corresponds to a center operating frequency of the first operating frequency band, and the second wavelength corresponds to a center operating frequency of the second operating frequency band.

9. The antenna system according to claim 7, wherein the first radiation arm and the second radiation arm each form a semi-annular bending structure, the third radiation arm is located in an area enclosed by the first radiation arm, and the fourth radiation arm is located in an area enclosed by the second radiation arm.

10. The antenna system according to claim 4, wherein the sixth included angle is 90 degrees.

11. The antenna system according to claim 3, wherein the first antenna and the second antenna are linear slot antennas that are perpendicular to each other on different planes, the first antenna comprises a first circuit board and a first slot, and the tuning stub is located on the first circuit board.

12. The antenna system according to claim 11, wherein the tuning stub is a slot, the tuning stub is located at an end that is of the first slot and that is closest to the second antenna, and the tuning slot is perpendicular to the first slot.

13. The antenna system according to claim 12, wherein a slot in the antenna system comprises a closed slot and/or an open slot, wherein an electrical length of the closed slot is a half of a first wavelength, an electrical length of the open slot is a quarter of the first wavelength, and the first wavelength corresponds to a center operating frequency of the first operating frequency band.

14. The antenna system according to claim 11, wherein the tuning stub is a radiation arm, and the tuning stub is vertically disposed on the first circuit board.

15. The antenna system according to claim 14, wherein the tuning stub is disposed at an end that is of the first slot and that is farthest away from the second antenna, a slot of the second antenna is located on one side of the first slot, and the tuning stub is located at an edge position on the other side of the first slot.

16. The antenna system according to claim 1, wherein the first plane is parallel to the equivalent current path of the first antenna and the equivalent current path of the second antenna.

17. The antenna system according to claim 16, wherein the first antenna, the second antenna, and the tuning stub are all in a straight line shape, the first antenna comprises a first radiation arm and a second radiation arm that are sequentially connected, a feed point of the first antenna is located between the first radiation arm and the second radiation arm, an electrical length of each of the first radiation arm and the second radiation arm is a quarter of a first wavelength, and the first wavelength corresponds to a center operating frequency of the first operating frequency band; and wherein the tuning stub is connected to a position that is on the first radiation arm or the second radiation arm and that is connected to or adjacent to the feed point, and the tuning stub is parallel to the first plane.

18. The antenna system according to claim 16, wherein the antenna system further comprises a circuit board, the first antenna and the second antenna are both in a straight line shape, and the first antenna and the second antenna are disposed on a first side edge of the circuit board at an interval, and are electrically connected to the circuit board;

wherein a feed point of the first antenna is located at a connection position between a radiation arm of the first antenna and the circuit board, and a feed point of the second antenna is located at a connection position between a radiation arm of the second antenna and the circuit board; and wherein the tuning stub is disposed on the first side edge of the circuit board and is electrically connected to the circuit board, and a current on the tuning stub and a current on the first antenna are opposite in direction.

19. The antenna system according to claim 1, wherein an electrical length of the tuning stub is greater than a quarter of a first wavelength, and/or the electrical length of the tuning stub is less than 0.35 times of the first wavelength, and wherein the first wavelength corresponds to the center operating frequency of the first operating frequency band.

20. An electronic device, comprising an antenna system comprising a first antenna, a second antenna, and a tuning stub, wherein the first antenna and the second antenna have a same first operating frequency band; wherein the tuning stub is electrically connected to the first antenna, and the tuning stub is configured to adjust an equivalent current path of the first antenna; wherein a connection line between a projection point of a maximum equivalent current point of the first antenna and a projection point of a maximum equivalent current point of the second antenna on a first plane and a projection of the equivalent current path of the first antenna on the first plane form a first included angle before the first antenna loads the tuning stub, and form a second included angle after the first antenna loads the tuning stub; wherein the connection line between the projection point of the maximum equivalent current point of the first antenna and the projection point of the maximum equivalent current point of the second antenna on the first plane and a projection of an equivalent current path of the second antenna on the first plane form a third included angle before the first antenna loads the tuning stub, and form a fourth included angle after the first antenna loads the tuning stub; and wherein a projection of the equivalent current path of the first antenna and a projection of the equivalent current path of the second antenna on a second plane form a fifth included angle before the first antenna loads the tuning stub, and form a sixth included angle after the first antenna loads the tuning stub, wherein the first included angle to the sixth included angle are all less than or equal to 90 degrees; and wherein the second included angle is greater than the first included angle, or the fourth included angle is greater than the third included angle, or the sixth included angle is greater than the fifth included angle.

* * * * *